INVENTOR
ROBERT M. STANLEY

BY Strauch, Nolan & Neale

ATTORNEYS

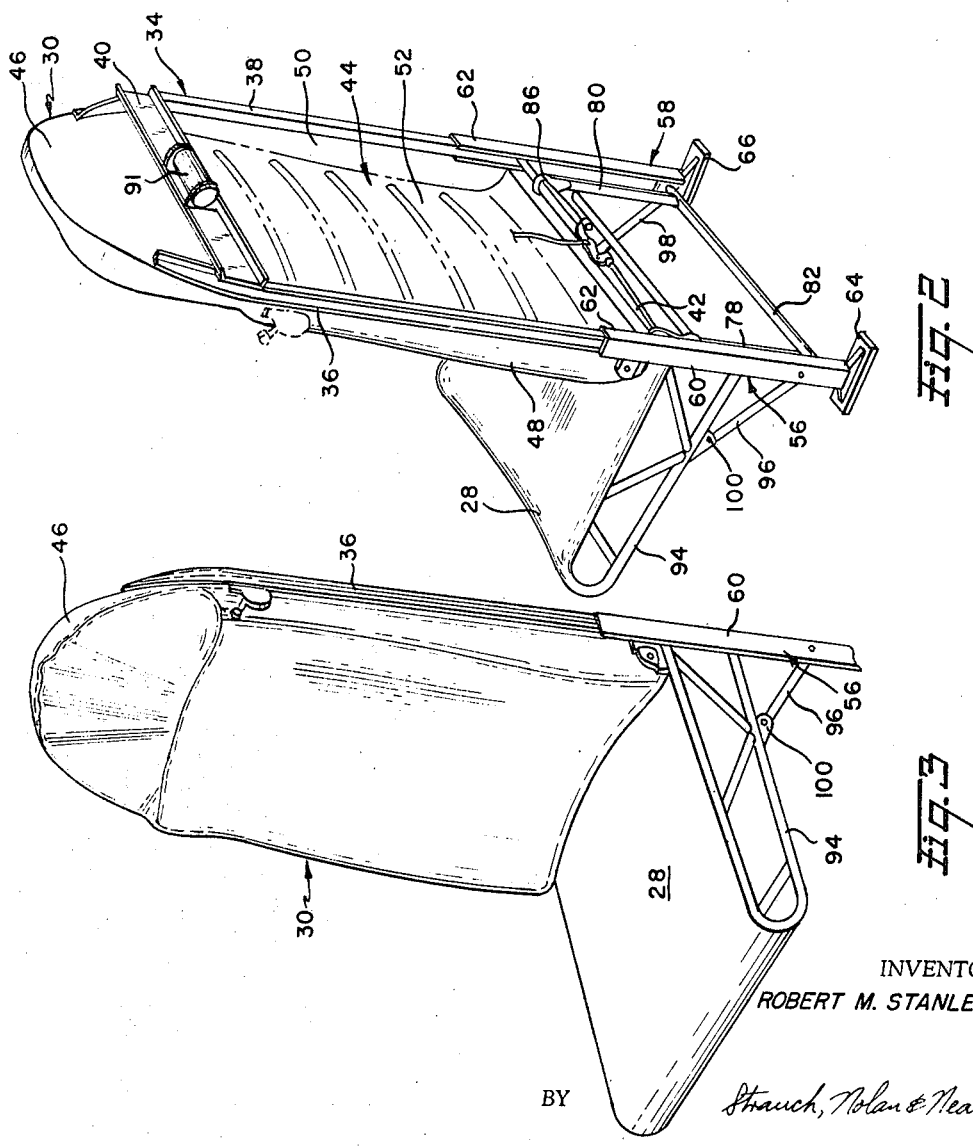

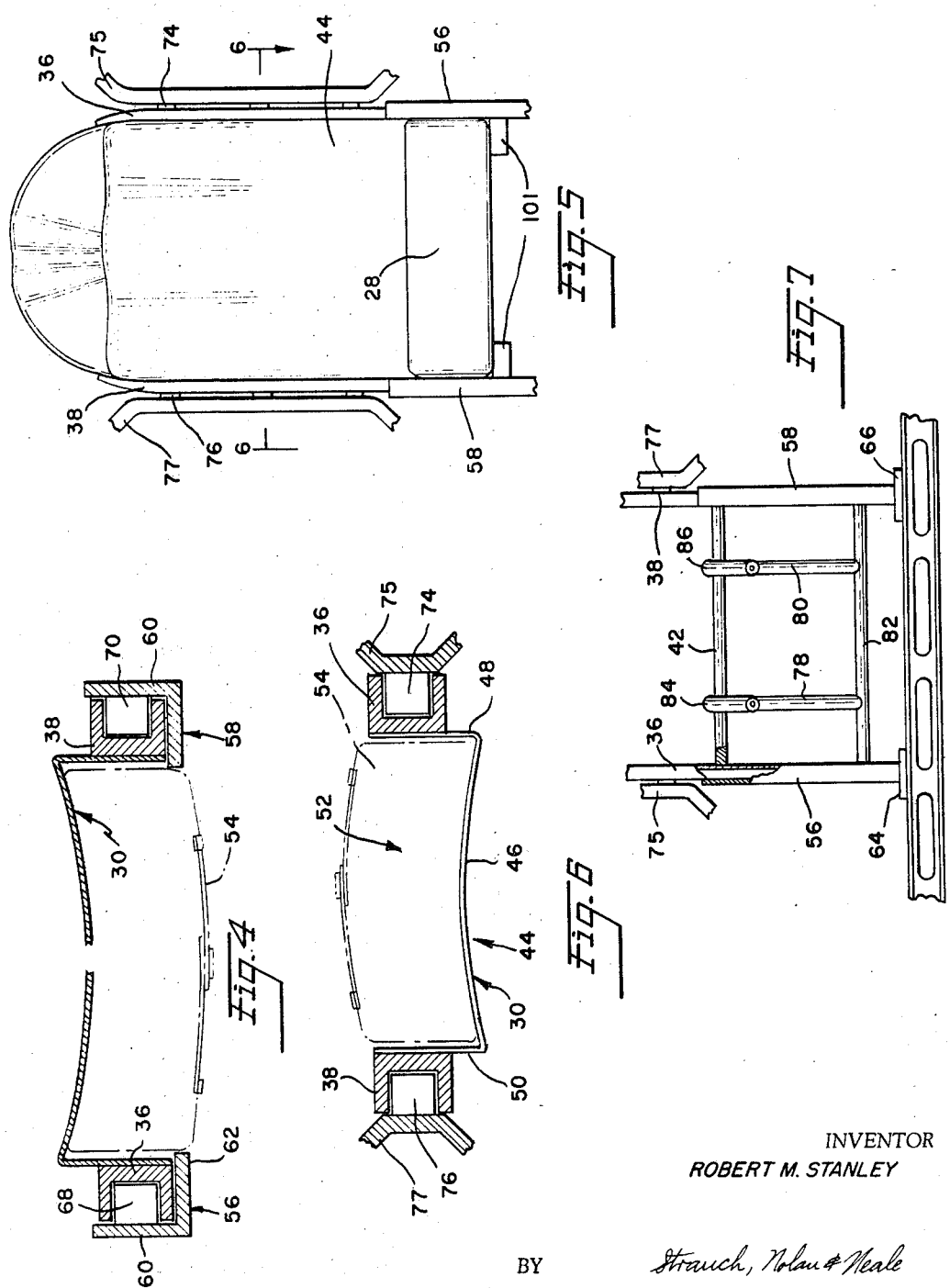

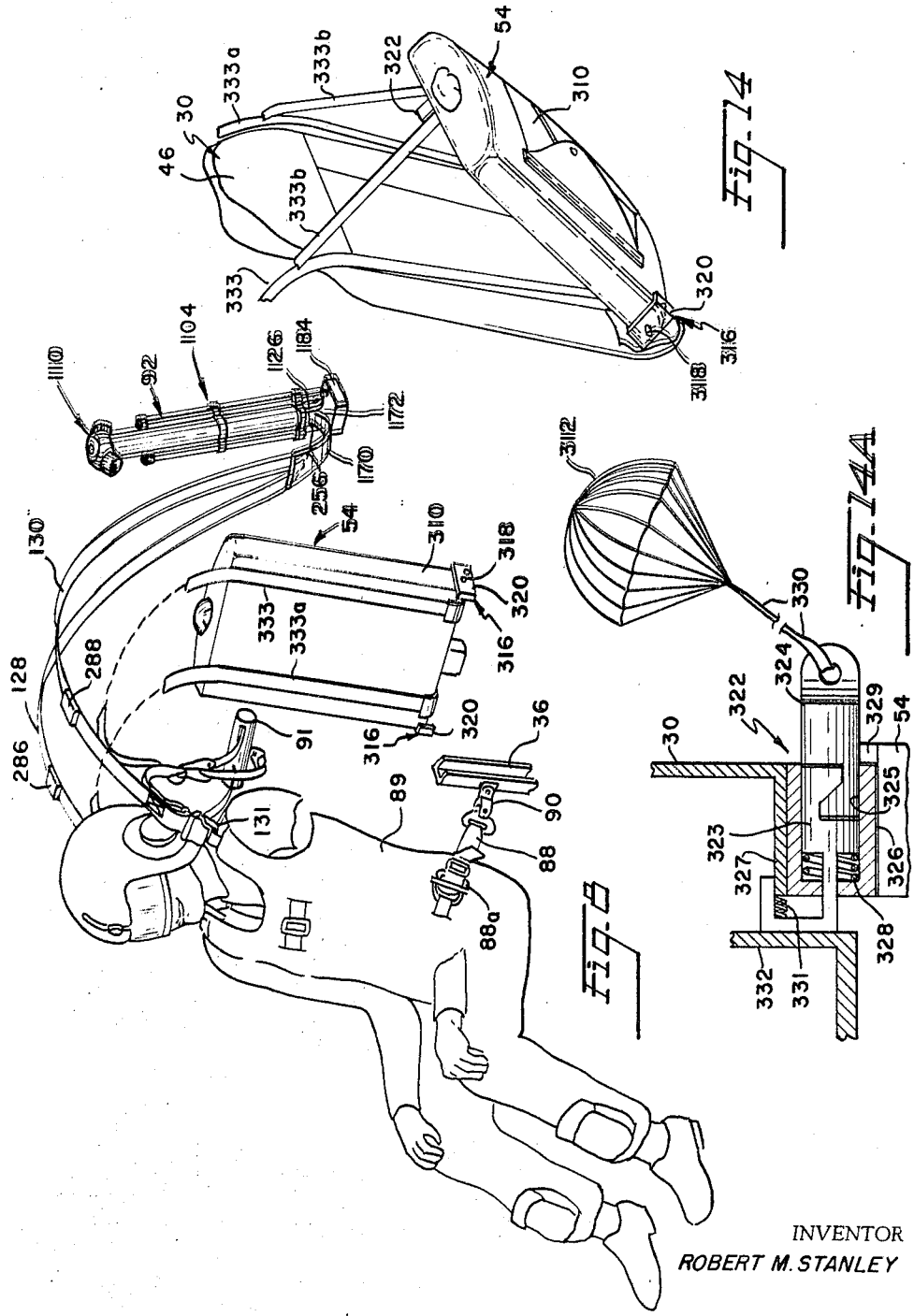

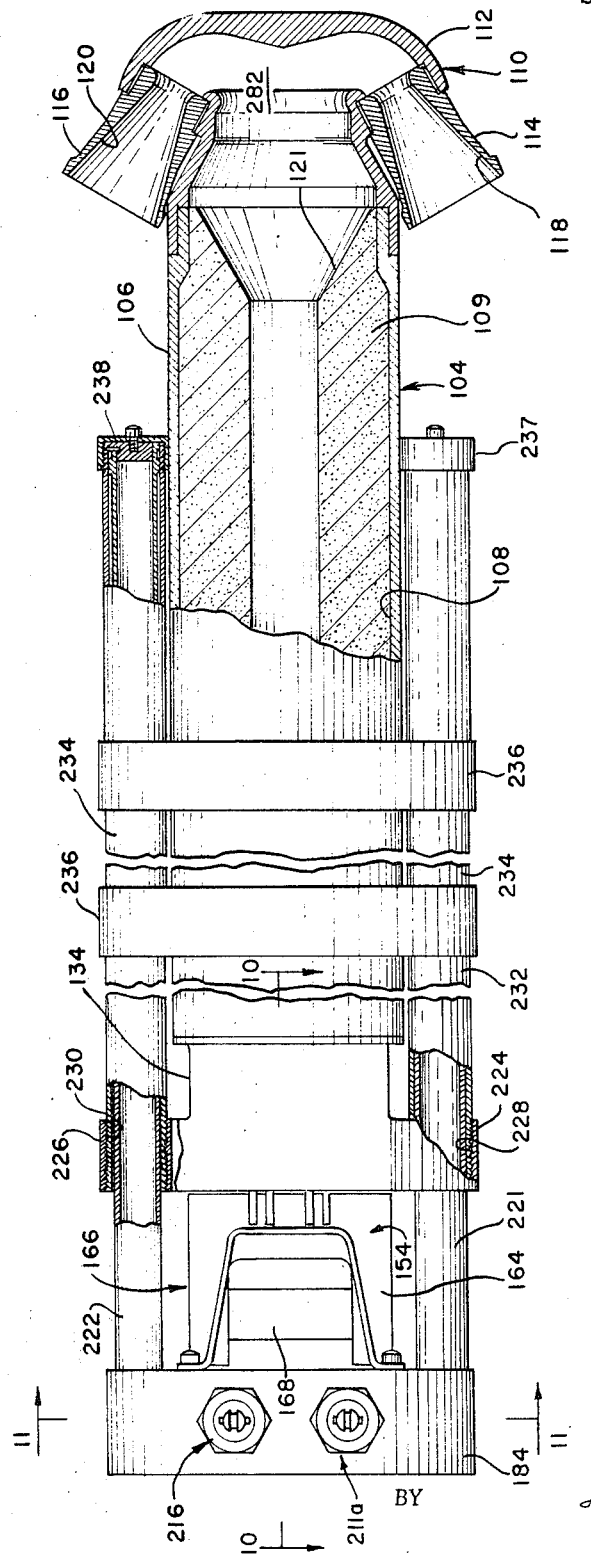

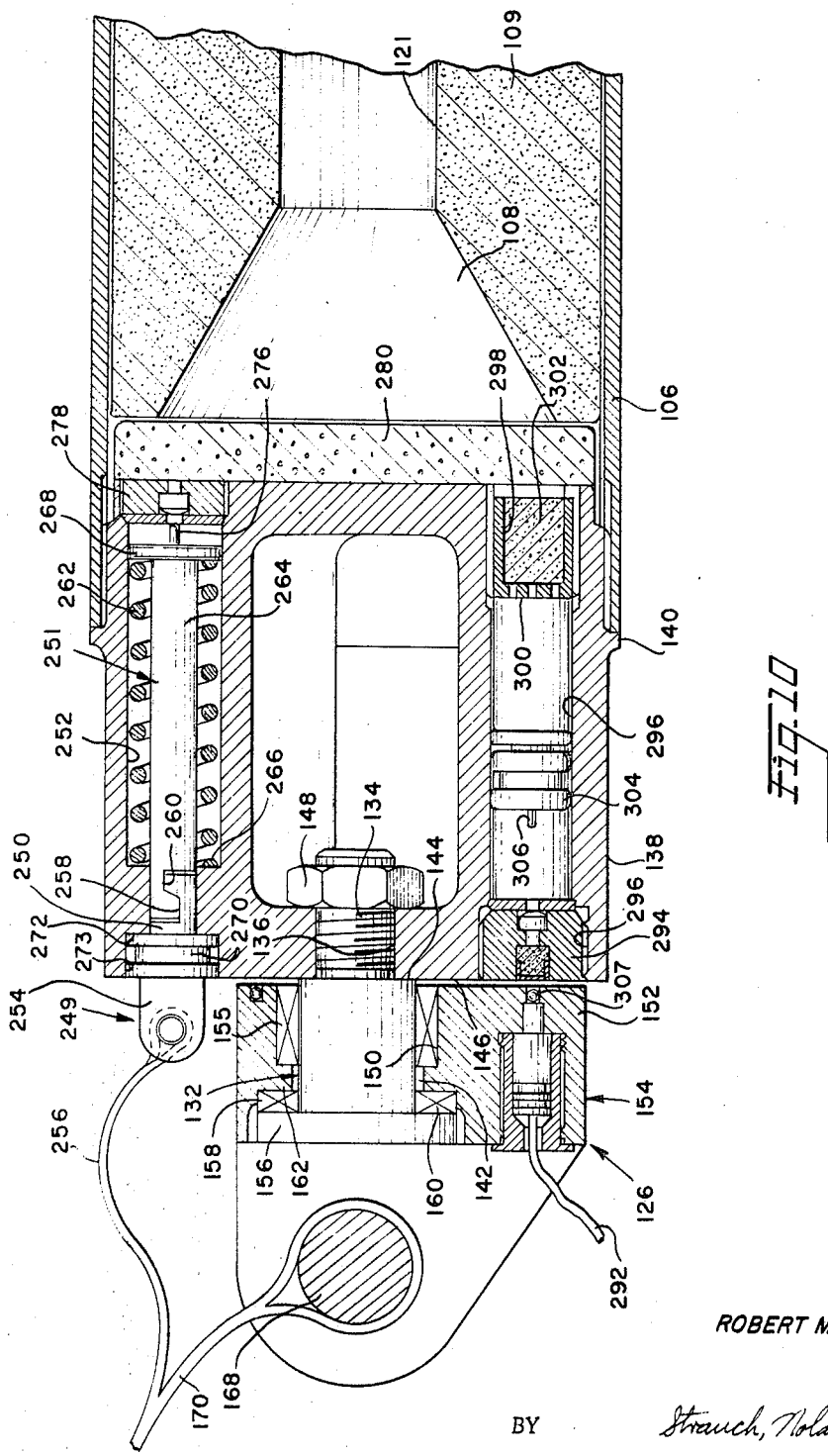

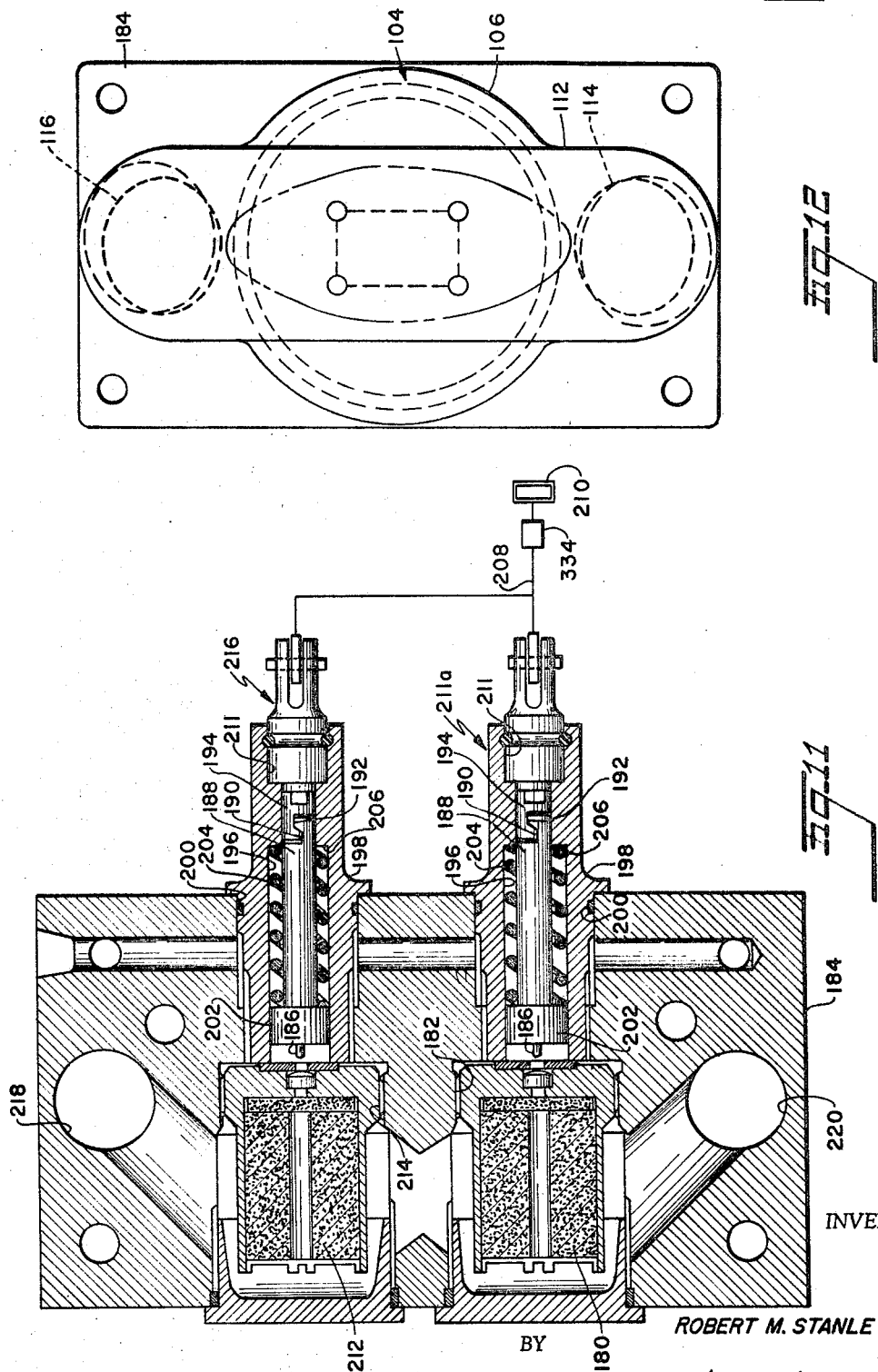

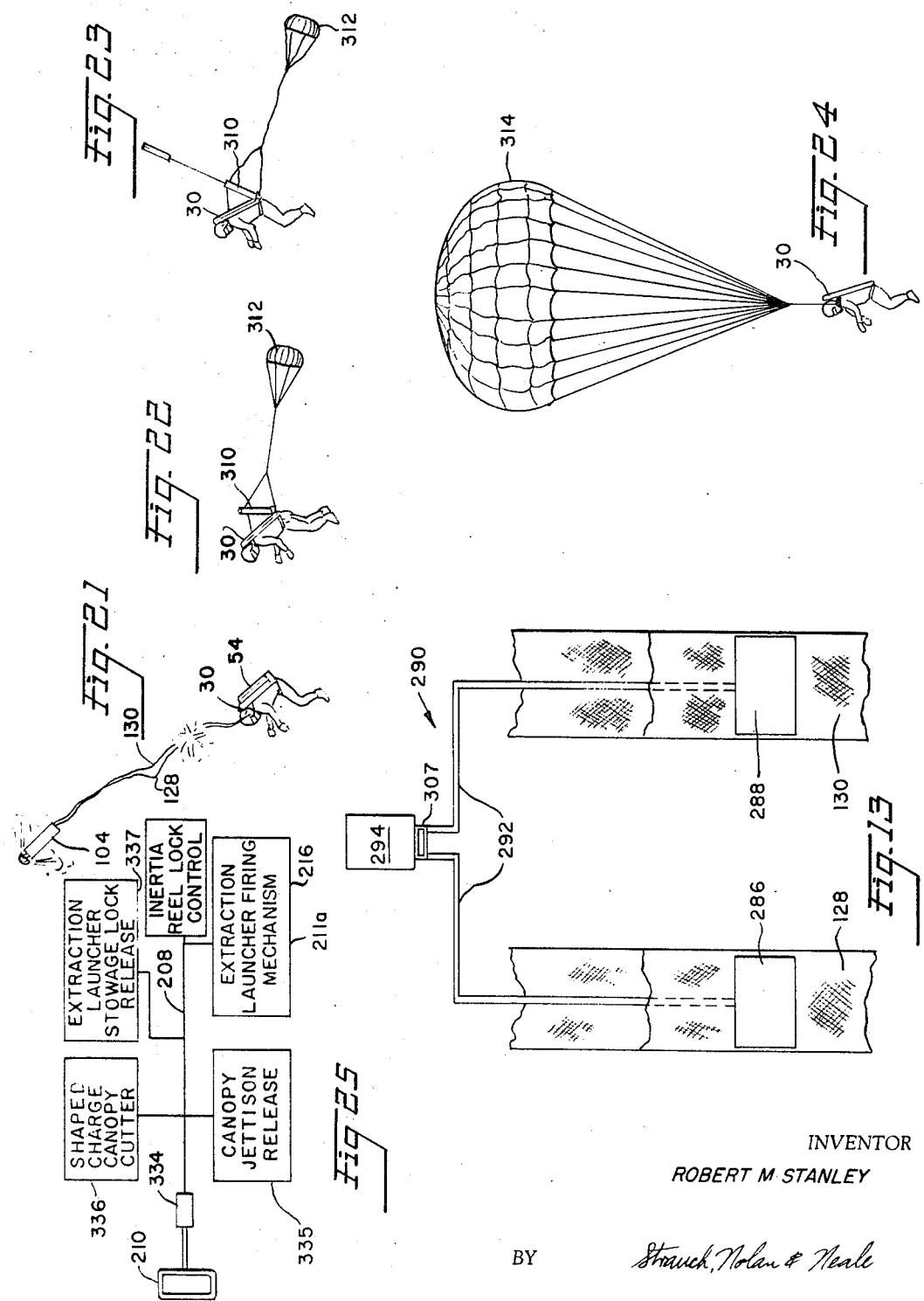

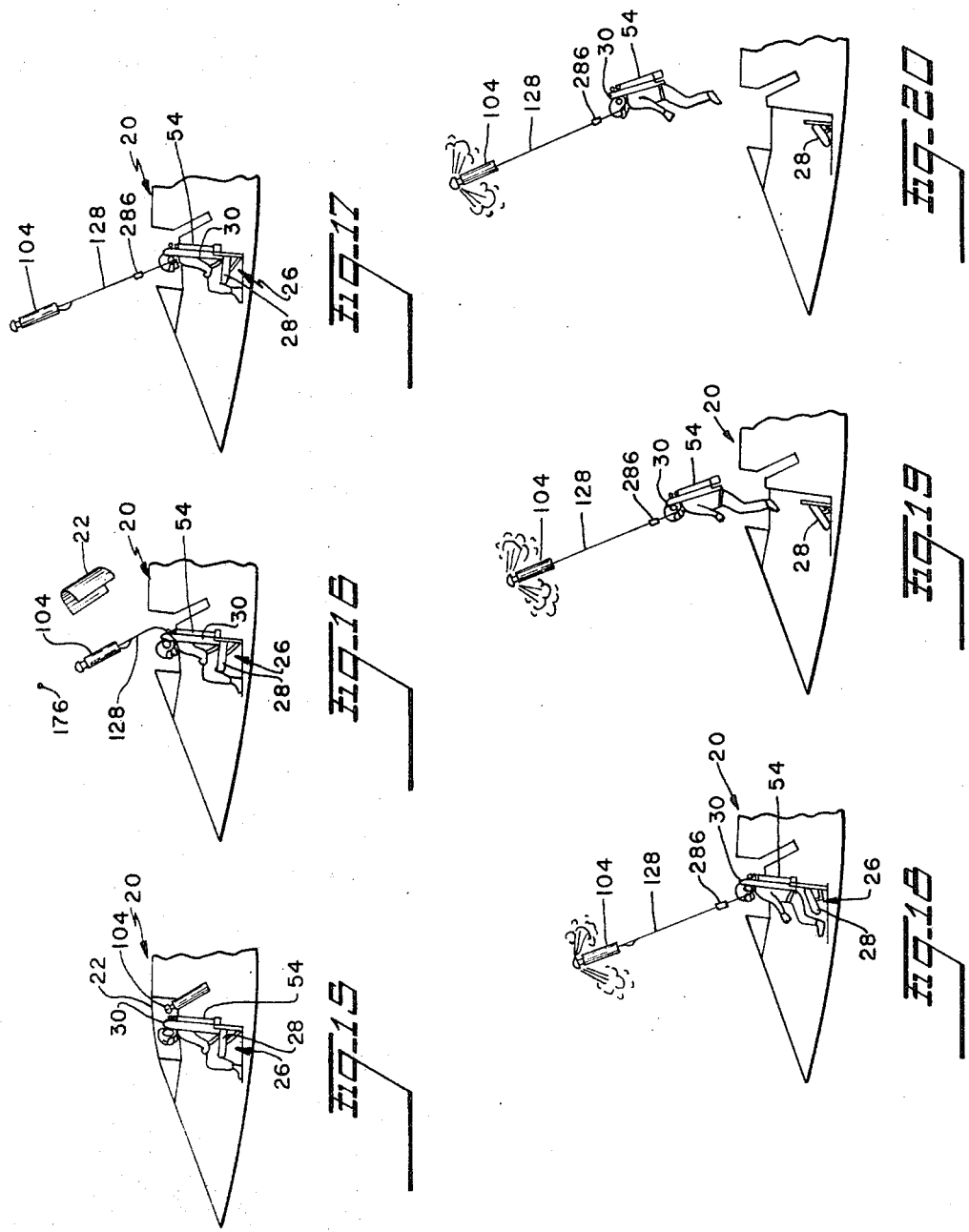

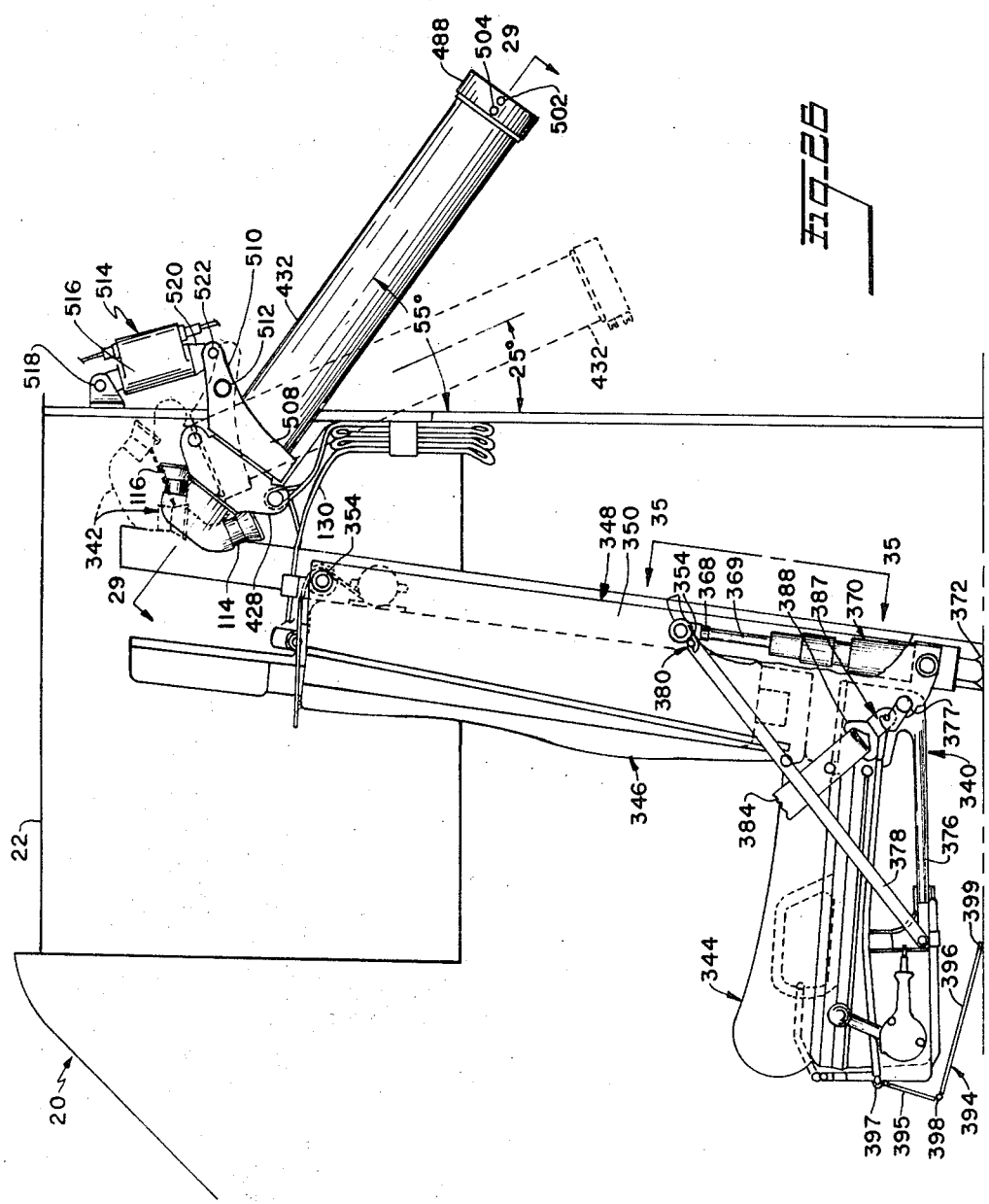

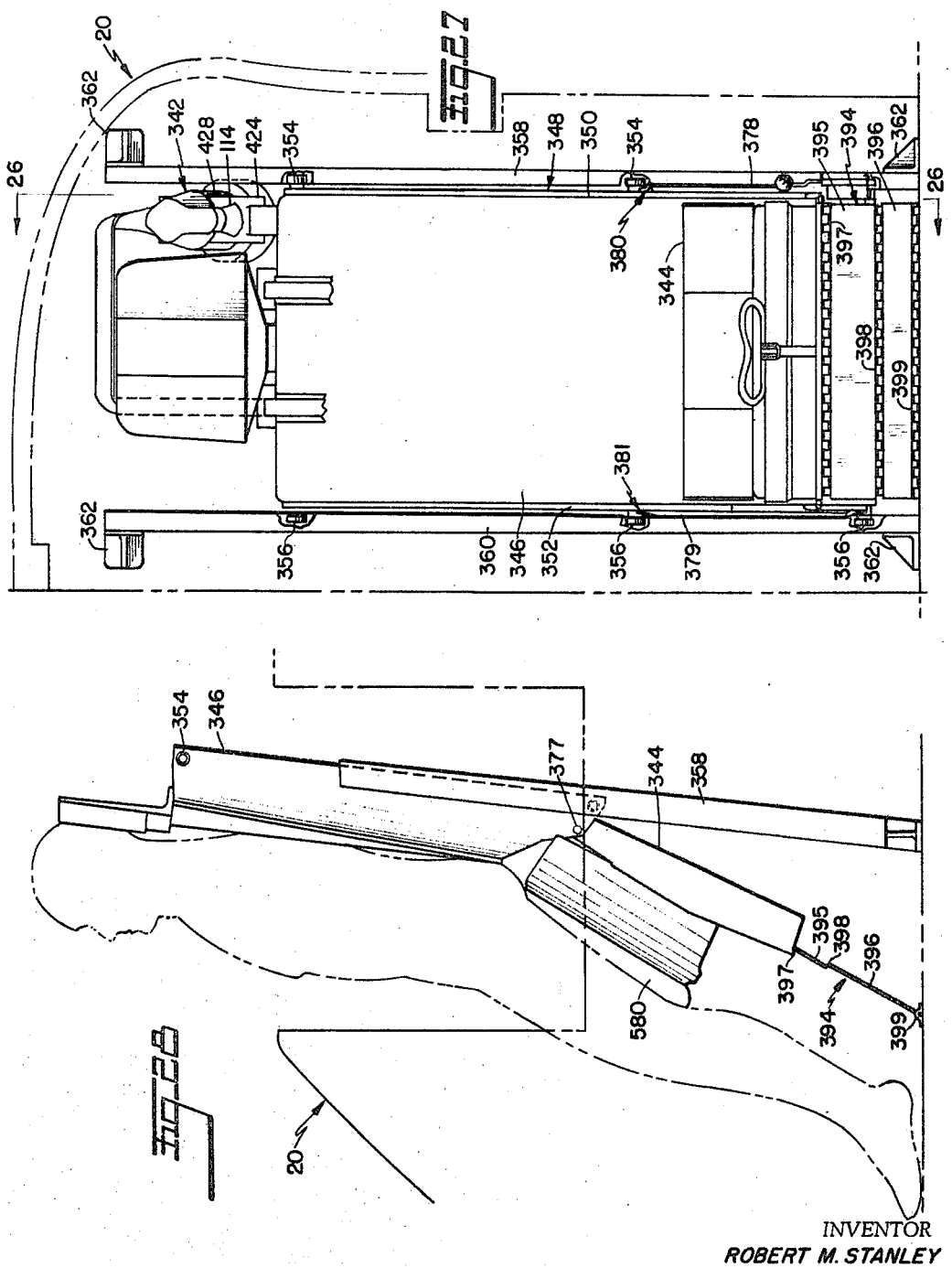

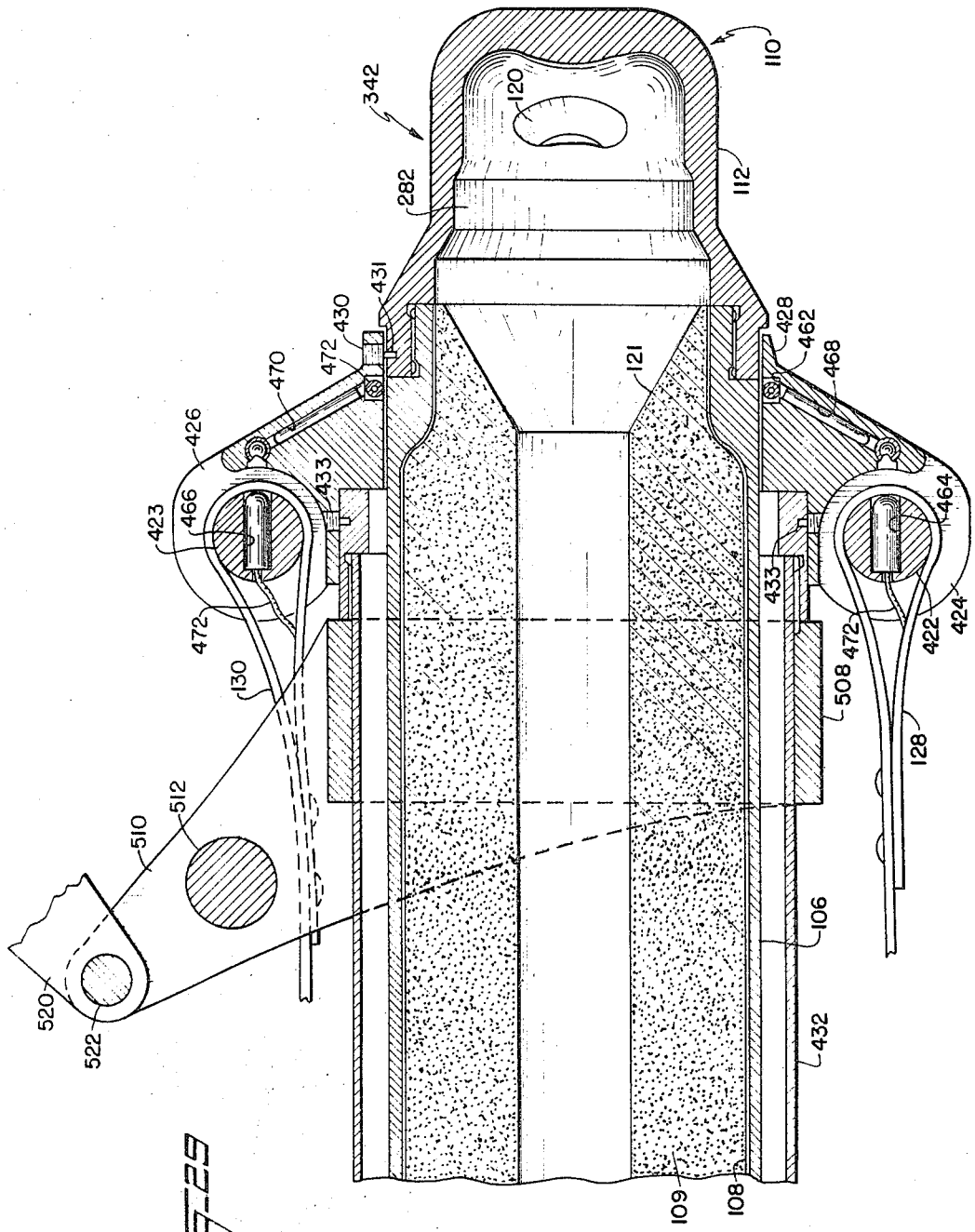

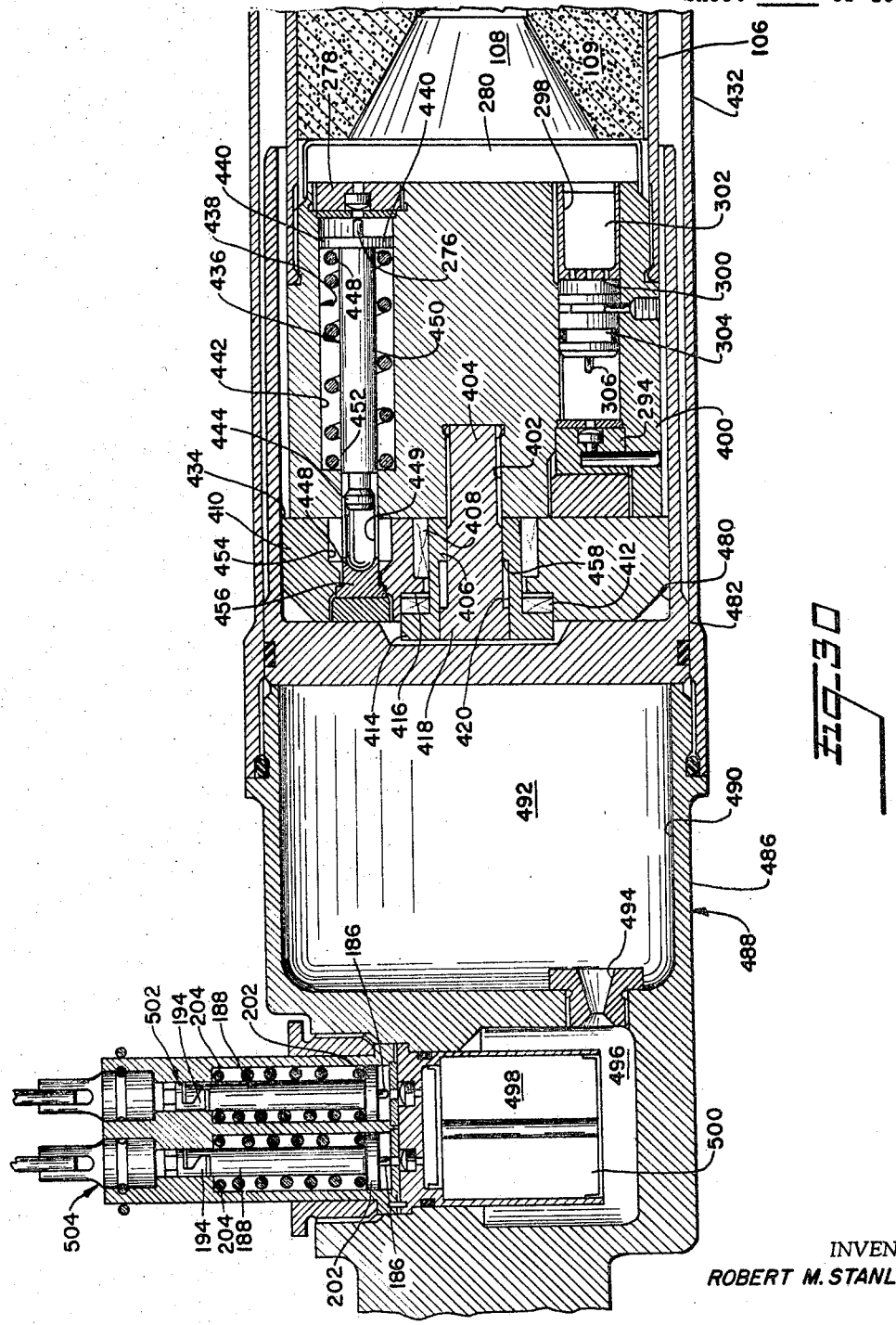

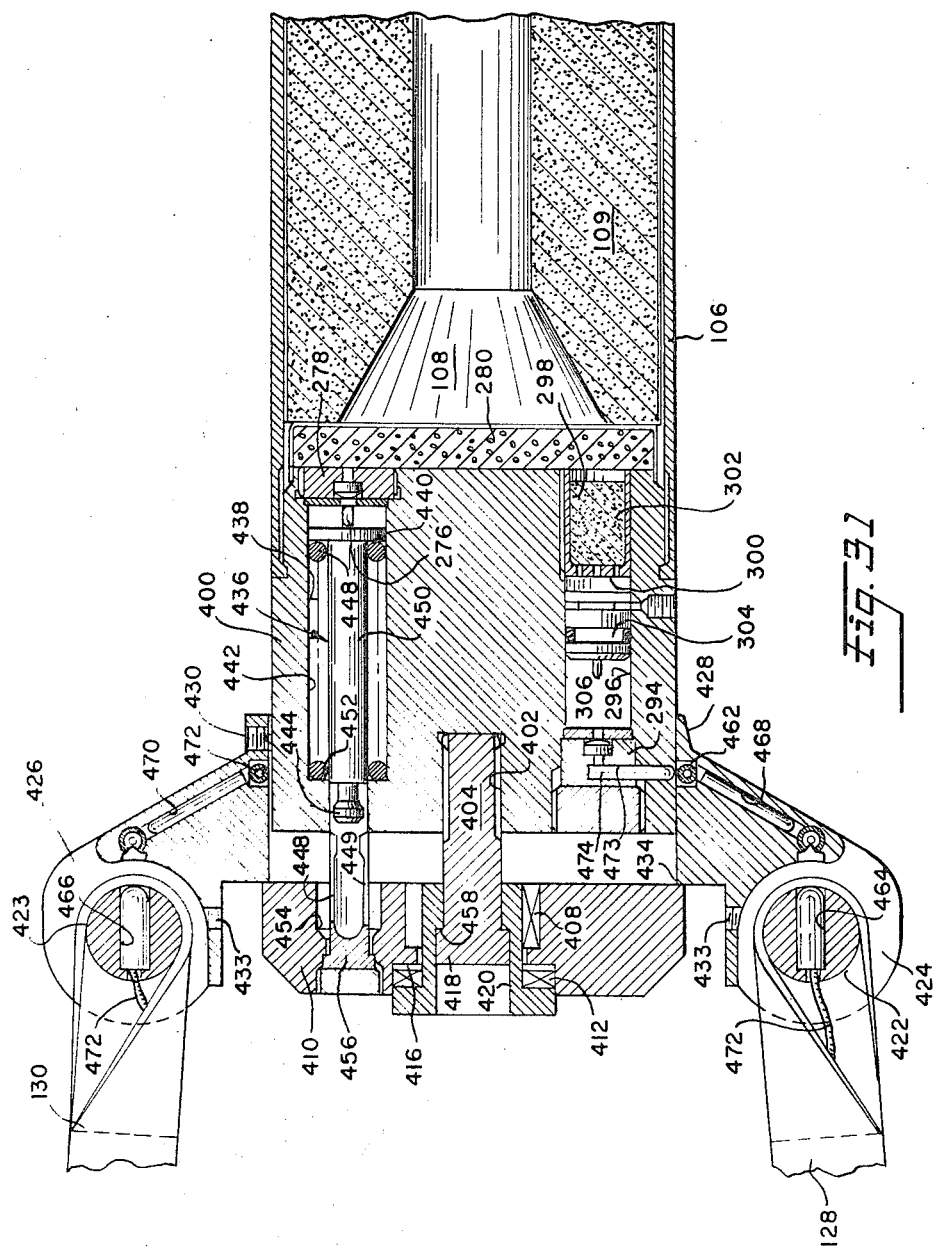

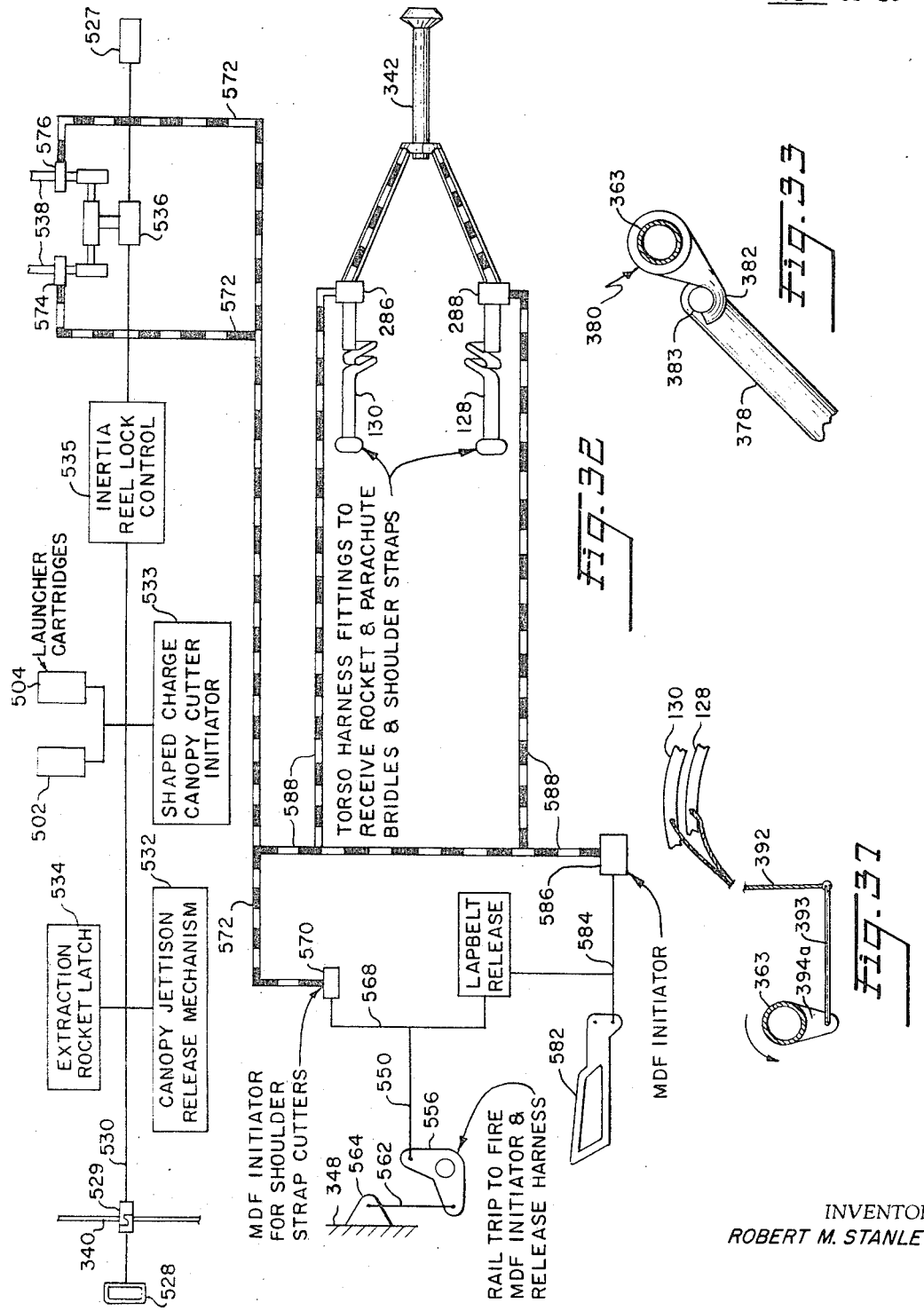

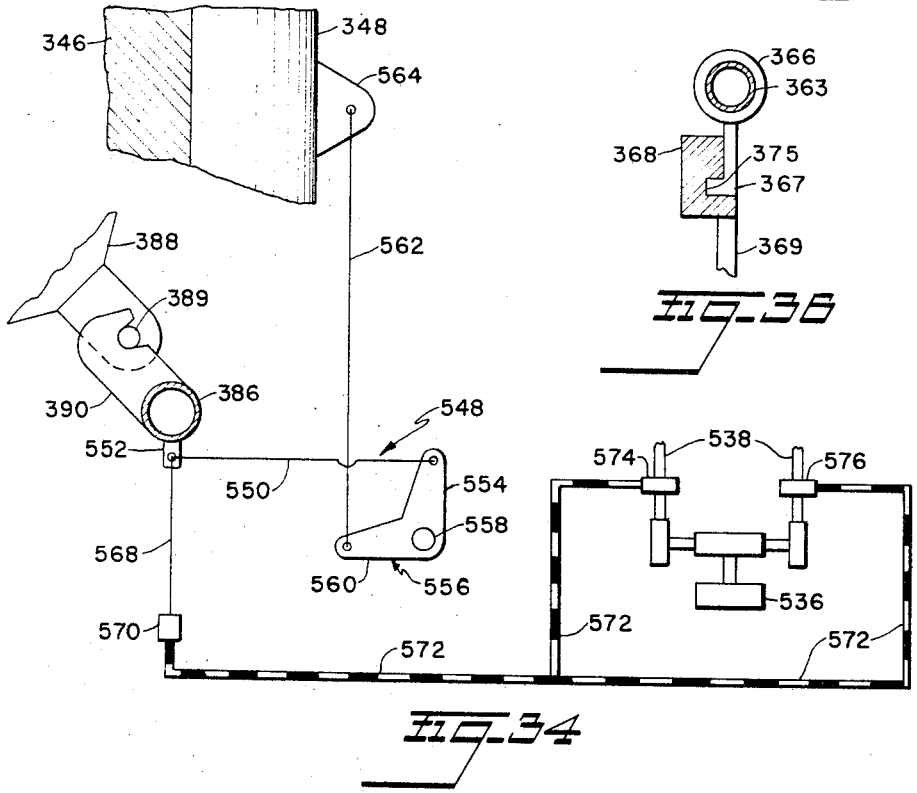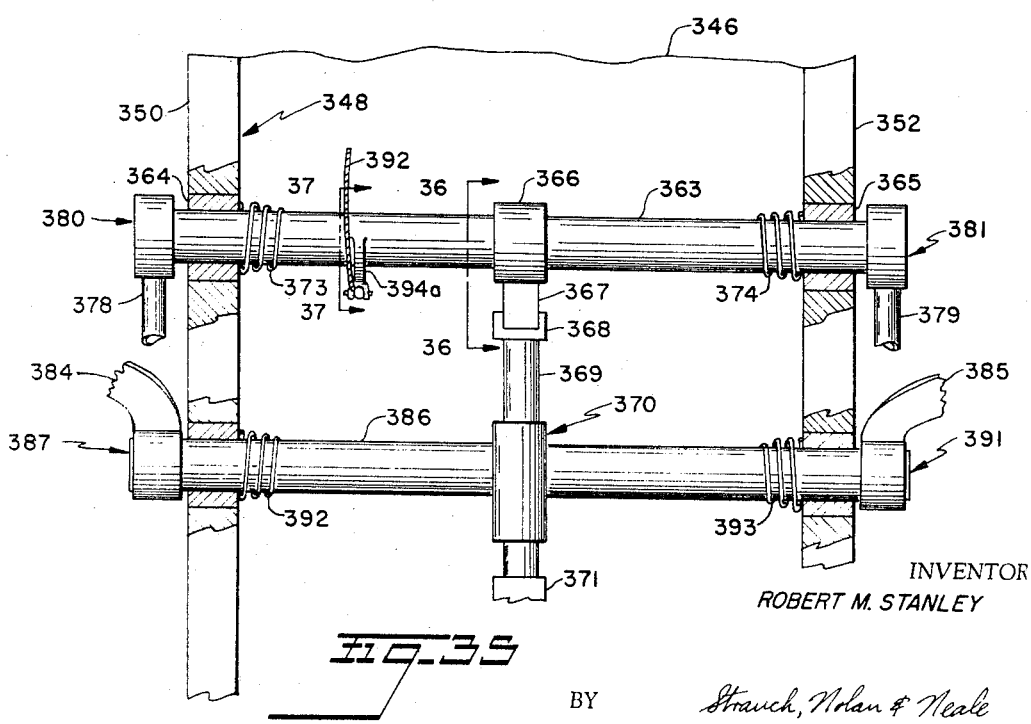

United States Patent Office 3,424,409
Patented Jan. 28, 1969

3,424,409
OCCUPANT ESCAPE APPARATUS FOR AN AIRCRAFT OR THE LIKE
Robert M. Stanley, Denver, Colo., assignor to Stanley Aviation Corporation, Denver, Colo., a corporation of New York
Continuation of application Ser. No. 390,709, Aug. 19, 1964. This application Dec. 12, 1966, Ser. No. 605,121
U.S. Cl. 244—122        20 Claims
Int. Cl. B64d 25/10; F41f 3/06; F42b 13/56

ABSTRACT OF THE DISCLOSURE

As escape apparatus for forcibly removing an occupant or other load from an air or space vehicle comprising a rocket carried by the vehicle, a motion transmitting towline connected to the rocket, and means connecting the towline to the occupant at a point remote from the connection of the towline to the rocket. The rocket is launched from the vehicle and ignited for flight away from the vehicle to tension the towline and thereby forcibly extract the occupant or load therefrom.

---

This application is a continuation of application Ser. No. 390,709 filed on Aug. 19, 1964, now abandoned for Occupant Escape Apparatus for an Aircraft or the like.

The present invention relates to escape apparatus for removing an occupant from a vehicle such as an airplane and is particularly concerned with a novel rocket action, escape system which is operative to extract the occupant from the vehicle.

Prior to this invention, most of the conventional escape devices which have been proposed for removing occupants from aircrafts and like vehicles have been of the ejection seat, catapult type in which a launching rocket or gun-fired projectile is rigidly secured to the back of the occupant's seat in the aircraft. The occupant strapped in the seat is tossed into the air by launching the rocket, and, after he has been carried a safe distance away from the aircraft, he is released from the seat to make a parachuted descent to the ground.

Although conventional ejection seats of the type described above generally operate satisfactorily, they have several inherent shortcomings. In this connection, the mounting location of the launching rocket is usually limited to the rear of the seat, and the seat is required to be of special, bulky, and heavy construction. In addition, the occupant must be released from the seat to allow for a safe parachuted descent and landing. Also, by confining the rocket mounting position to the seat back, various difficulties have been encountered in aiming the rocket, in controlling the flight of the rocket, and in diverting the hot exhaust gases to avoid injury to the occupant.

This invention contemplates a safe, reliable, compact, and structurally simple occupant escape apparatus essentially comprising a tractor type rocket which is secured by a flexible tow line assembly to a harness worn by the occupant. The rocket is mounted in the airplane in any convenient location and is selectively launched in an unignited condition through the cockpit opening after the cockpit canopy is removed. As the rocket moves away from the airplane, the connecting tow line is pulled taut to automatically ignite the rocket propellant to extract the occupant from the aircraft. Following a predetermined rocket flight period, the tow line, according to this invention, is automatically severed, freeing the extracted occupant from the rocket and allowing safe deployment of the occupant's recovery parachute. Since the extraction rocket of this invention need not be secured to the occupant's seat, it can be located in any convenient location in the cockpit and can be easily aimed to establish an optimum escape flight path for removing the occupant quickly and safely from the aircraft.

In accordance with a preferred embodiment of this invention, a seat assembly for accommodating the occupant is novelly constructed to allow the occupant's posture to become erect as he is pulled towards the escape opening by the extraction rocket. This permits the occupant to egress through a smaller escape opening in comparison with the size of escape openings needed for conventional catapulted ejection seats which require knee and toe clearance for ejecting the occupant without injury.

Accordingly, a major object of this invention is to provide a novel escape apparatus for safely and quickly extracting an occupant from a vehicle.

More specifically, it is an object of this invention to provide a novel escape apparatus wherein a tractor type rocket is secured by a flexible tow line to a harness worn by the occupant of an aircraft, space craft, or the like and is selectively launchable to extract or pull the occupant from the craft.

Another specific object of this invention is to extract an occupant from an aircraft or the like by a novel escape apparatus comprising a specially constructed tractor type rocket having a nozzle assembly adjacent its advancing end for enabling the rocket to effectively pull itself through the air.

Still another object of this invention is to extract an occupant from an aircraft or the like by a novel escape apparatus comprising a tractor type rocket which is secured by a flexible tow line to a harness worn by the occupant and which is provided with a special nozzle assembly for effectively pulling the rocket through the air and for imparting a stabilizing spin to the rocket.

Another object of this invention is to extract an occupant from an aircraft or the like by a novel escape apparatus wherein a tractor type rocket is secured to the occupant by an assembly comprising a flexible tow line which is pulled taut by launching the rocket and which is automatically severed just prior to rocket burn out. This aspect of the invention permits the rocket to move under its own power a safe distance away from the occupant and his recovery parachute.

Still a further object of this invention is to extract an occupant from an aircraft or the like by a novel rocket action escape apparatus wherein the occupant is continuously strapped throughout the rocket propelled escape flight and the parachuted descent to a seat back which is detachable from the seat pan of a special seat assembly and which novelly mounts the occupant's parachute. The seat pan, according to this invention, folds down as the seat back moves up to allow the occupant's posture to become erect as he is pulled by the rocket through the escape opening.

Another object of this invention is to extract an occupant from an aircraft or the like by a novel escape apparatus wherein the occupant is secured by a flexible tow line to a rocket which is selectively launched in unignited condition from the craft and which is automatically fired when the tow line is pulled taut as a result of movement of the rocket away from the craft.

Still another object of this invention is to provide a novel seat assembly which is extensible to form a chute for guiding an occupant from an aircraft or the like in a substantially erect position.

A further object of this invention is to extract an occupant from a vehicle by a novel rocket motor which may be selectively aimed for effecting optimum flight paths for escape at high and low vehicle speeds respectively.

Further objects of this invention will presently appear as the description proceeds in connection with the appended claims and annexed drawings, wherein:

FIGURE 2 is a perspective view of the seat structure shown in FIGURE 1 as viewed from the rearward left-hand corner of the seat;

FIGURE 3 is a perspective view of the seat structure illustrated in FIGURE 1 as viewed from the forward left-hand corner of the seat;

FIGURE 4 is a section taken substantially along lines 4—4 of FIGURE 1;

FIGURE 5 is a fragmentary front elevation of the seat structure illustrated in FIGURE 1;

FIGURE 6 is a section taken substantially along lines 6—6 of FIGURE 5;

FIGURE 7 is a fragmentary rear elevation of the mounting structure for the seat shown in FIGURE 1;

FIGURE 8 is a fragmentary perspective view of the extraction rocket and recovery parachute pack together with the strap connections to the occupant's torso harness illustrated in FIGURE 1;

FIGURE 9 is a partially sectioned side elevation of the extraction rocket illustrated in FIGURE 1;

FIGURE 10 is a section taken substantially along lines 10—10 of FIGURE 9;

FIGURE 11 is a section taken substantially along lines 11—11 of FIGURE 9;

FIGURE 12 is a top plan view of the extraction rocket illustrated in FIGURE 1;

FIGURE 13 is a partially schematic, fragmentary plan view of the structure for detonating the linear shaped charges to sever the tow lines securing the occupant of the aircraft to the extraction rocket;

FIGURE 14 is a fragmentary perspective view of the seat back illustrated in FIGURE 1 and showing the recovery parachute pack assembly pivoted to its rearwardly tilted position with respect to the seat back;

FIGURE 14A is a longitudinal section of the latch assembly shown in FIGURE 14 for retaining the recovery parachute pack in its stored position.

Figure 1:
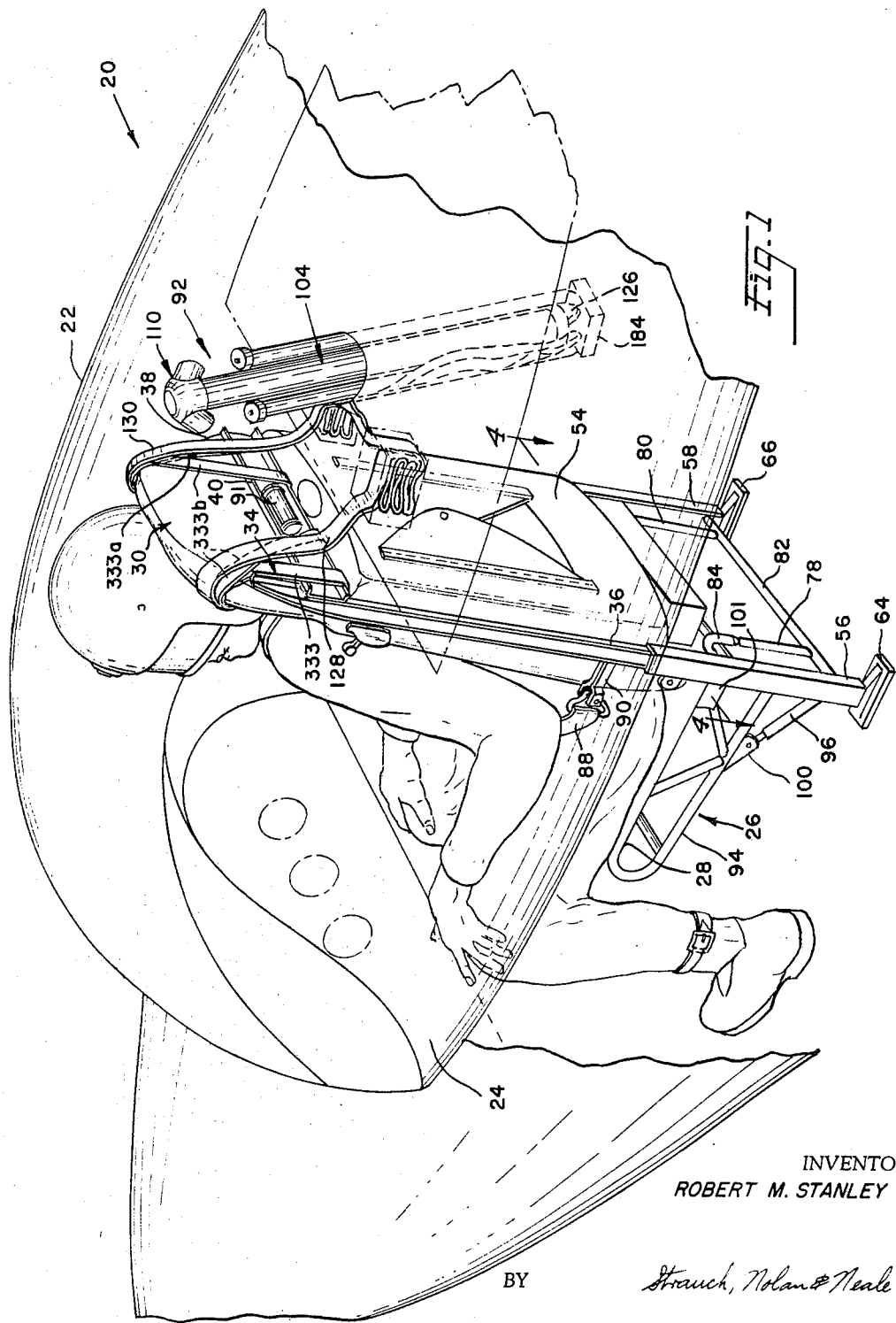
FIGURE 1 is a fragmentary perspective view of an aircraft containing one embodiment of the escape apparatus of this invention.

FIGURES 15–24 inclusive illustrate the sequence of operation of the escape apparatus of this invention;

FIGURE 25 is a schematic view of the occupant actuated means for operating the escape apparatus of this invention;

FIGURE 26 is a side elevation of a preferred embodiment showing a modified seat and extraction rocket construction;

FIGURE 27 is a front elevation of the seat structure shown in FIGURE 26;

FIGURE 28 is a side elevation illustrating the seat assembly of FIGURE 26 in its fully deployed pilot extracting position;

FIGURE 29 is a longitudinal section taken substantially along lines 29—29 of FIGURE 26 and illustrating details of the modified rocket motor assembly according to the preferred embodiment of this invention with the parts of the rocket motor assembly being shown in inactive, stored positions;

FIGURE 30 is a continuation of the longitudinal section shown in FIGURE 29;

FIGURE 31 is a fragmentary section similar to that of FIGURES 29 and 30 but showing the parts of the rocket assembly in operating position for extracting the occupant from the aircraft;

FIGURE 32 is a schematic view of the control system for operating the escape apparatus illustrated in FIGURE 26;

FIGURE 33 is an enlarged fragmentary partially sectioned side elevation of the mechanism for releasably retaining the seat assembly seat pan in the sitting position shown in FIGURE 26;

FIGURE 34 is a partially schematic side elevation of the mechanism for releasably retaining the occupant seat belt shown in FIGURE 26;

FIGURE 35 is a partially sectioned rear elevation of the seat back shown in FIGURE 26;

FIGURE 36 is a section taken along lines 36—36 of FIGURE 35; and

FIGURE 37 is a section taken along lines 37—37 of FIGURE 35.

Referring now to the drawings and more particularly to FIGURE 1 wherein a construction embodying the principles of the present invention is shown, the reference numeral 20 generally designates an aircraft having a conventional jettisonable canopy 22 for enclosing a cockpit 24. Mounted in cockpit 24 is a seat assembly 26 adapted to accommodate the pilot and comprising an occupant-supporting, net covered seat pan 28 and an upstanding seat back 30 extending upwardly from the rearward edge of pan 28.

According to this invention, seat back 30 is detachably fixed to seat pan 28, and as shown in FIGURES 1 and 2, comprises a rectangular framework 34 having parallel, outwardly opening, channel shaped, side slide rails 36 and 38.

Rails 36 and 38 are rigidly joined together at their upper ends by a transverse channel member 40 and at their lower ends by a rigid rod 42 which extends between and at right angles to rails 36 and 38.

With continued reference to FIGURE 2, seat back 30 has a rigid, one-piece support pan 44 formed a forwardly bowed back and head rest 46 extending between parallel, spaced apart, side plate portions 48 and 50 which are fixed to and extend forwardly from rails 36 and 38 respectively. Back and head rest 46 and plate portions 48 and 50 co-operate to define a rearwardly opening recess 52 which extends between rails 36 and 38 for receiving a recovery parachute pack assembly 54 (FIGURE 1). The head and back supporting surface of pan 44 may be padded and covered in any suitable, conventional manner as shown in FIGURE 3.

As best shown in FIGURE 2, the lower ends of rails 36 and 38 slidably engage rigid parallel guide tracks 56 and 58 each comprising a structural angle having mutually perpendicular legs 60 and 62 respectively extending forwardly along the side of seat assembly 26 and laterally along the rear of assembly 26. Guide tracks 56 and 58 are rearwardly inclined at a slight angle and are respectively rigidly mounted on base plates 64 and 66 which are fixed by any suitable means to the frame of the aircraft. The outer, rearwardly facing surfaces of rails 36 and 38 may slidably bear against the forwardly facing surfaces of tracks 56 and 58. Seat pan 28 is supported from tracks 56 and 58 in a manner to be described in detail later on.

Referring now to FIGURE 4, a plurality of aligned, vertically spaced apart guide blocks 68 (one shown) are fixed to leg 60 of track 56 and extend into the outwardly opening channel of rail 36 to slidably support rail 36 for movement along track 56. Similarly, a plurality of aligned vertically spaced apart guide blocks 70 are fixed to leg 60 of track 58 and extend into the outwardly opening channel of rail 38 for slidably supporting rail 38 for movement along track 58. Blocks 68 and 70 slidably engage the opposed side wall portions of rails 36 and 38 respectively to retain seat back 30 against forward or rearward movement but to permit upward displacement of seat back 30 longitudinally along tracks 56 and 58.

Referring now to FIGURES 5 and 6, a further plurality of aligned, vertically spaced apart guide blocks 74 (one shown in FIGURE 6) extend into the channel of rail 36 and are fixed to a rigid upstanding side member 75 which forms a part of the aircraft frame. Similarly, another set of aligned, vertically spaced apart guide blocks 76 (one shown in FIGURE 6) extend into the channel of rail 38 and are fixed to an upstanding side member 77 which also forms a part of the aircraft frame. Blocks 74 and 76 cooperate with blocks 68 and 70 to retain seat back 30 against forward, rearward, and sideward movement, but to permit upward sliding movement of seat back 30 along tracks 56 and 58.

For vertically supporting seat back 30 in its normal upright position, a pair of parallel, upstanding support rods 78 and 80, as shown in FIGURES 2 and 7, are rigidly mounted at their lower ends on a cross bar 82 which extends laterally between and which is fixed at opposite ends to tracks 56 and 58. Respectively mounted on the upper ends of rods 78 and 80 are suitable latch assemblies 84 and 86 which are releasably clamped around rod 42 to support and vertically retain assembly 30 in the position shown in FIGURES 1 and 2.

Latch assemblies 84 and 86 may be of any conventional construction which release in response to a strong upwardly exerted force or to mechanical actuation, permitting seat back 30 to freely move upwardly along tracks 56 and 58.

As best shown in FIGURE 8, the occupant of seat assembly 26 is strapped only to seat back 30 by a pair of conventional lap straps 88 (one shown) joining seat back 30 to hip fitting 88a (one shown) of a conventional torso harness 89. The aft ends of straps 88 are secured to rails 36 and 38 by suitable fitting and strap assemblies 90 (one shown). A conventional inertia reel having a recoiling mechanism 91 mounted on the channel 40 is provided to hold the occupant's head back against the head rest portion of seat back 30 during his escape from the aircraft. It will be observed that the occupant is not secured to seat pan 28 so that he is free to be lifted clear of pan 28 with seat back 30 securely strapped to him in its back and head supporting position.

According to this invention, the occupant is extracted from cockpit 24 with seat back 30 securely strapped to him by a novel launcher and tractor type rocket motor assembly 92 to be described in detail later on.

With continued reference to FIGURES 1-3, seat pan 28 is mounted on a framework 94. A pair of parallel support rods 96 and 98 respectively fixed at corresponding ends to tracks 56 and 58 extend forwardly and upwardly and are pivotally secured at 100 to opposite sides of framework 94 for swingably mounting seat pan 28 about a substantially horizontal axis. The center of gravity of seat pan 28 is located forwardly of the pivot axis at 100 so that the forward end of pan 28 tends to tilt downwardly from the horizontal position shown in FIGURES 1-3.

To retain seat pan 28 in its normal seating position, pan 44 bears against the rearward marginal edge of seat pan 28 to hold it firmly against a pair of stop abutments 101 (FIGURE 5) comprising blocks fixed to tracks 56 and 58. When seat back 30 is lifted along tracks 56 and 58, seat pan 28 is then free to swing about its pivot connection at 100 to a downwardly tilted position shown in FIGURE 19, permitting the occupant's legs to straighten out as he is pulled out of the cockpit.

Referring now to FIGURE 9, assembly 92 for extracting the occupant from cockpit 24 is shown to comprise a tractor type rocket 104 having a tubular casing 106 which defines a combustion chamber 108 for receiving a suitable gas generating propellant indicated at 109.

Mounted on casing 106 at the forward or advancing end of rocket 104 is a nose cap and nozzle assembly 110 comprising a hollow nose cap housing 112 which mounts a pair of rearwardly outwardly directed venting nozzles 114 and 116. Nozzles 114 and 116 are on diametrically opposed sides of housing 112 and respectively define venturi gas exhaust passages 118 and 120 which communicate with chamber 108 through a central passage 121. The gas generated by burning the propellant stored in chamber 108 is exhausted through passages 118 and 120 to effectively pull rocket 104 through the air.

As shown in FIGURES 1 and 8, a swivel joint assembly 126 mounted on the aft end of rocket 104 is secured to a pair of tow lines 128 and 130 in the form of a bridle. Lines 128 and 130 are respectively attached to a pair of shoulder connectors 131 (one shown in FIGURE 8) forming a part of torso harness 89 to extract the occupant from cockpit 24 when rocket 104 is fired in a manner to be described in greater detail later on.

As best shown in FIGURE 10, swivel joint assembly 126 comprises a cylindrical swivel post 132 having a reduced diametered, threaded end section 134 which extends coaxially and freely through a smooth cylindrical bore 136 formed in a cylindrical extension housing 138. The forward end of housing 138 extends coaxially into the open aft end of casing 106. A radially outwardly extending lip 140 on housing 138 snugly abuts the rearwardly facing end of casing 106 in the manner shown. Housing 138 is rigidly fixed to casing 106 by any suitable means. As shown, bore 136 is axially aligned with the longitudinal axis of casing 106.

With continued reference to FIGURE 10, post 132 is formed with an enlarged diametered, smooth cylindrical, intermediate section 142 extending rearwardly from housing 138 and providing a forwardly facing annular shoulder 144 which bears against a flat end face 146 of housing 138. Swivel post 132 is axially retained in place by abutment of shoulder 144 against end face 146 and a nut 148 threaded on the forward end of section 134 projecting beyond bore 136. Nut 148 is drawn up tight to pull shoulder 144 snug against the end face of housing 138.

With continued reference to FIGURE 10, section 142 extends coaxially through a stepped bore 150 formed in a cross piece 152 of a yoke 154. A bearing comprising a bushing 155 contained in bore 150 and carried by section 142 coaxially mounts yoke 154 for rotation about an axis substantially aligning with that of casing 106. Post 132 terminates at its rearward end projecting beyond bore 150 in an enlarged cylindrical head 156 which is held against a thrust bearing 158. Bearing 158 is fitted in a counterbored recess 160 and is seated against a rearward facing annular shoulder 162 formed at the bottom of recess 160. With this arrangement and construction of parts, yoke 154 is rotatable on post 132, but is axially retained between opposed surfaces on head 156 and housing 138 respectively.

As shown in FIGURE 9, cross piece 152 integrally joins a pair of rearwardly extending, parallel arms 164 and 166. A cross bar 168 fixed at opposite ends to arms 164 and 166 extends along an axis that normally intersects the rotational axis of swivel post 132.

As shown in FIGURE 8, lines 128 and 130, each comprising a tough, flexible, multiple layer strap of nylon, are securely joined to one end of a flexible multiple layer nylon strap 170. The opposite end of strap 170 is formed with a loop 172 which extends around cross bar 168 between arms 164 and 166 of yoke 154. The ends of lines 128 and 130 remote from strap 170 are suitably secured to torso harness 89 in the region of the occupant's shoulders on opposite sides of his head. Swivel joint assembly 126 permits rocket 104 to be spun about its axis in a manner to be described shortly without spinning the occupant or entangling lines 128 and 130. The lengths of lines 128 and 130 are the same and are about six feet to permit the extracted occupant to trail remotely behind rocket 104 after it is launched.

In the aircraft having a cockpit of the type shown in FIGURE 1, rocket 104 is preferably located to the rear of seat structure 26 and is an upstanding, slightly forwardly inclined position for launching along a straight path extending through the cockpit opening provided by removing canopy 22. Rocket 104 is so aimed that its straight launching path passes through a point indicated at 176 in FIGURE 16 which coincides with the end of strap 170 attached to yoke 154 when lines 128 and 130 and strap 170 are pulled taut as a result of launching the rocket. By aiming rocket 104 in this manner, the pull on lines 128 and 130 will establish the free flight path of rocket 104 passing beyond point 176.

According to this invention, rocket 104 is secured to the occupant's torso harness solely by lines 128 and 130, and in this embodiment, seat back 30 is strapped to the occupant for removal with the occupant by launching rocket 104. Since rocket 104 is not directly attached or secured to any part of seat assembly 26, it is not restricted to the location shown in the drawings, but may be mounted in any other convenient location depending upon the type and construction of the vehicle in which it is disposed. This aspect renders the escape apparatus of the present invention easily adaptable to many different types of vehicles such as, for example, aerial jeeps, aerospace service vehicles, and space vehicles in addition to the observation aircraft, cargo aircraft, and helicopters.

To launch rocket 104 from the aircraft, a conventional cartridge 180 (see FIGURE 11) is mounted in a stepped bore 182 formed in a launcher breech comprising a rocket mounting breechblock 184. Breechblock 184 is suitably fixed to the frame of the aircraft.

With continued reference to FIGURE 11, a cylindrical pin 188 mounting a cartridge firing pin 186 is formed with a notch 190 which interfits with a notch 192 formed in a cylindrical disconnect pin 194. Pins 188 and 194 are coaxially, slidably received in a stepped bore 196 formed in an adapter piece 198. Adapter piece 198 is received in a reduced diametered section 200 of bore 182 and is fixed in place adjacent to cartridge 180.

As shown, pin 188 is provided at its inner end with an enlarged head 202 which carries firing pin 186. A coiled compression spring 204 surrounding a reduced diametered shank portion of pin 188 reacts against an internal shoulder 206 in adapter piece 198 to bias pin 188 towards an operative firing position.

With continued reference to FIGURE 11, pin 194 is connected by a schematically illustrated, mechanical, motion transmitting cable and linkage assembly 208 to an operating handle 210 which is manually manipulatable by the occupant of the aircraft to detonate cartridge 180. In the inoperative position of handle 210 shown in FIGURE 11, pin 188 is held in retracted, inoperative position against the bias of spring 204. When handle 210 is pulled by the occupant of the aircraft, pins 188 and 194 are pulled outwardly to compress spring 204. When the notched ends of pins 188 and 194 are withdrawn into an enlarged end bore section 211 of stepped bore 196, pin 194 shifts laterally permitting the interlocking ends of pins 188 and 194 to slip apart. As a result, pin 194 separates from pin 188 to allow spring 204 to urge pin 188 inwardly to detonate cartridge 180. Pins 188, 194, and 186 comprise a firing mechanism 211a which is essentially of conventional construction.

With continued reference to FIGURE 11, a second rocket launching cartridge 212 is mounted in an enlarged section of a stepped through bore 214 formed in breechblock 184 in parallel relation to bore 182. Cartridge 212 is detonated by a firing mechanism 216 which is preferably of the same construction as the firing mechanism for cartridge 180, like reference numerals being used to designate like parts. As shown, firing mechanism 216 is also connected to handle 210 with the result that cartridges 180 and 212 are detonated simultaneously by pulling handle 210.

The expanding gases generated by the detonation of cartridges 180 and 212 pass through a pair of bored passages 218 and 220 in breechblock 184 and into passages defined by rigid tubes 221 and 222 as shown in FIGURE 9. Tubes 221 and 222 are securely threaded at their lower ends in breechblock 184 and extend upwardly in parallel with the longitudinal axis of rocket 104 on diametrically opposite sides of casing 106. The upper ends of tubes 221 and 222 respectively extend coaxially into launching cylinders 232 and 234 which extend upwardly along opposite sides of casing 106. The lower ends of cylinders 232 and 234 are respectively threaded into bores 228 and 230 formed in diametrically opposed arms 224 and 226 which are rigid with housing 138. A plurality of suitable, axially spaced apart mounting brackets 236 rigidly secure cylinders 232 and 234 to casing 106. The upper ends of cylinders 232 and 234 are spaced axially rearwardly from cap and nozzle assembly 110 as shown and are respectively closed by suitable end caps 237 and 238.

Any suitable conventional means may be employed for releasably mounting rocket 104 on breechblock 184 such as a bracket and shearable locking element assembly (not shown).

When cartridges 180 and 212 are selectively detonated by manual actuation of handle 210, the expanding gases produced from the detonation travel through passages 218 and 220 and launching tubes 221 and 222 to pressurize cylinders 232 and 234 with the result that rocket 104 is lifted off breechblock 184 and moved upwardly along launching tubes 221 and 222. Tubes 221 and 222 supportingly extend into cylinders 232 and 234 sufficiently far to provide for a powered stroke of approximately two feet before cylinders 232 and 234 move axially beyond tubes 221 and 222.

It will be observed that actuation of handle 210 to initiate operation of the escape apparatus of this invention does not ignite the propellant contained in rocket 104 with the result that rocket 104 is launched from the aircraft in an unignited condition. By launching of rocket 104 through the cockpit opening after canopy 22 is removed, lines 128 and 130 are pulled taut to automatically actuate a firing mechanism 249 (FIGURE 10) for igniting the rocket propellant in a manner now to be described.

As shown in FIGURE 10, mechanism 249 is similar to that described for detonating cartridge 180 and comprises a pair of cylindrical, axially aligned pins 250 and 251 slidable and coaxially received in a stepped through bore 252 formed in housing 138 along an axis extending parallel to the longitudinal axis of casing 106. An apertured ear 254 fixed to pin 250 and extending rearwardly beyond bore 252 is secured by a tough nylon cord 256 to strap 170. Cord 256 has a length which is sufficiently short that it is tensioned to pull pin 250 rearwardly out of bore 252 when strap 170 is pulled taut. It will be appreciated that cord 256 may alternatively be suitably secured to either line 128 or line 130 or to torso harness 89. In any event, the stretched out length of cord 256 is sufficiently short to pull pin 250 out of bore 252 when lines 128 and 130 and strap 170 are pulled taut as a result of launching rocket 104 from the aircraft.

With continuing reference to FIGURE 10, pins 250 and 251 are releasably interlocked by interfitting notches 258 and 260 formed at their inner adjacent ends. A coiled spring 262 surrounding a reduced diametered shank portion 264 of pin 251 is compressed between axially opposed surfaces respectively defined by a forwardly facing internal shoulder 266 and an enlarged head section 268 formed integral with shank portion 264 at the forward end of pin 251.

As shown in FIGURE 10, pin 250 is provided with an enlarged diametered end section 270 which abuts a rearwardly facing annular shoulder 272 formed by an enlarged end section 273 of bore 252 and acting as a stop abutment surface to limit forward displacement of pin 250 under the bias exerted by spring 262. In its normal inoperative position, pin 250 thus holds pin 251 in the retracted position shown in FIGURE 10.

With continued reference to FIGURE 10, a firing pin 276 fixed to pin 251 and extending forwardly from head section 268 is adapted to engage a conventional detonator 278 when pin 251 is displaced forwardly from the position shown in the drawings. Detonator 278 bears axially against a disc shaped charge 280 comprising black powder contained in the aft end of casing 106. Charge 208 is ignited by firing detonator 278. The main body of rocket propellant in turn is ignited by charge 280.

Preferably, a second firing mechanism (not shown) having the same construction as mechanism 249 is mounted in housing 138 and is actuatable simultaneously with mechanism 249 to assure ignition of charge 280.

From the foregoing firing and detonating construction just described, it will be appreciated that when the occupant tow line assembly comprising lines 128 and 130 and strap 170 is pulled taut as a result of launching rocket 104 from the aircraft, pins 250 and 251 are pulled axially rearwardly by cord 256 to compress spring 262. By withdrawing the interlocked ends of pins 250 and 251 into bore section 273, the notched ends slip out of engagement with each other to separate pin 251 from pin 250 and permit pin 251 to move forwardly under the bias exerted by spring 262. By displacing pin 251 forwardly, firing pin 276 penetrates detonator with sufficient impact to ignite charge 280. The rocket propellant is quickly ignited by charge 280 to propel rocket 104 away from the aircraft and thereby extract the occupant from cockpit 24 in a manner to be explained in greater detail later on.

As best shown in FIGURE 12, the longitudinal axes of nozzles 114 and 116 are deliberately canted in the same angular direction with respect to a diametral plane passing through the longitudinal axis of rocket 104. The angle which the longitudinal axis of each of the nozzles 114 and 116 makes with this diametral plane preferably is about 2 to 3 degrees. Combustion gases resulting from the ignition of the rocket propellant flow forwardly along central passage 121 and through the chamber space 282 (FIGURE 9) defined by head 112 which diverts the gases by an angle of approximately 150° for exit through nozzle passages 118 and 120. Owing to the canted relationship of nozzles 114 and 116, a spin is imparted to rocket 104 to stabilize it during its free flight away from the aircraft.

With reference to FIGURES 8 and 13, conventional linear shaped charges 286 and 288 for cutting lines 128 and 130 are automatically detonated by a detonating and fuse assembly 290 to free the extracted occupant from rocket 104 before his recovery parachute is opened.

As best shown in FIGURE 13, charges 286 and 288 are securely fixed to lines 128 and 130 respectively and are connected to standard sheath confined, mild detonating fuses 292 forming a part of assembly 290. Fuses 292 conveniently may be confined between the outer strap layers of lines 128 and 130 and are connected to a detonator 294 shown in FIGURE 10.

With continued reference to FIGURE 10, detonator 294 is securely received in the rearward end of a stepped through bore 296 formed in housing 138 along an axis extending parallel to the longitudinal axis of rocket casing 106. Mounted in the forward end bore 296 is a rigid forwardly opening, metal well 298 having an apertured bottom 300 and containing a suitable charge 302 of rocket propellant. A piston 304 slidably mounted in an intermediate section of bore 296 between well 298 and detonator 294 carries a firing pin 306 for firing detonator 294. An annular groove seated mild detonating fuse 307 mounted in the forwardly directed end face of yoke 154 is located at a radius which is the same as the radial distance of bore 296 from the longitudinal axis of housing 138 so that regardless of the angular position of yoke 154 a portion of fuse 307 axially aligns with detonator 294. Thus, by firing detonator 294, fuse 307 is detonated. As shown, fuse 307 is arranged to detonate fuses 292. Piston 304 may be releasably held in its inoperative position shown in FIGURE 10 by a shearable post (not shown).

Charge 280 in addition to igniting the main body of rocket propellant also ignites charge 302 in well 298. Charge 302 is sized to burn out just prior to burn-out of propellant 109 to expose the apertured bottom 300 to combustion chamber 108. As a result, the gases generated by burning propellant 109 are then free to pass through the apertured bottom of well 298 to urge piston 304 rearwardly for firing detonator 294. Firing of detonator 294 detonates fuse 307 which, in turn, ignites fuses 292. Fuses 292 detonate almost instantaneously down along straps 128 and 130 to detonate charges 286 and 288. The detonation of charges 286 and 288 cut lines 128 and 130 to free the extracted occupant from rocket 104. At this stage of the escape sequence, rocket 104 has sufficient propellant left to fly a sufficient distance away from the extracted occupant to permit safe projection and deployment of his recovery parachute. A second, unshown firing mechanism for detonating fuse 307 is mounted in housing 138 and is the same as the firing mechanism comprising detonator 294, piston 304, and well 298 to assure detonation of charges 286 and 288.

Referring now to FIGURE 14, parachute pack assembly 54 comprises a recovery parachute 314 (FIGURE 24) which may be projected and deployed manually or by a suitable timer. The recovery parachute may be extracted from its pack by the construction described in United States Letters Patent No. 3,133,178 issued on May 19, 1964 to Fred B. Stencel for an Automatically Projected and Deployed Parachute.

With continued reference to FIGURE 14, parachute 314 and a pilot parachute 312 (FIGURE 22) are stored in a pack 310 forming a part of assembly 54. Assembly 54 is pivotally mounted on back and head rest 46 by a pair of pin and bracket assemblies 316 (one shown in FIGURE 14) disposed on opposite sides and adjacent the lower end of pack 310. Each assembly 316 comprises a pivot pin 318 rotatably carried by rest 46 and fixed to a bracket 320 which depends from pack 310. A suitable, spring loaded latch assembly 322 (FIGURE 14A) at the upper end of pack 310 secures assembly 54 in its stored position in recess 52 as shown in FIGURE 1. Latch assembly 322 may be of any conventional construction that releases by a rearward force exerted on pack 310 by the deployment of pilot parachute 312 to pivot pack 310 about a normally horizontal axis of pins 318 to the position shown in FIGURE 14 where the upper end of assembly 54 tilts rearwardly and away from seat back 30.

As shown in FIGURE 14A, latch assembly 322 may comprise a pair of cylindrical pins 323 and 324 coaxially and slidably received in a stepped through bore 325 which is formed in a housing 326 fixed to seat back 30. Pins 323 and 324 are provided with notched, interlocking ends which separate when pins 323 and 324 are pulled out of housing 326 in a manner similar to that described for firing mechanism 249.

Pin 323 is provided with a hooked end that engages a lip 327 of seat back 30 and is held in its latching position by a coiled spring 328. Pin 324 is fixed by a bracket 329 to pack assembly 54 and is secured by a lanyard 330 to pilot parachute 312.

When parachute 312 is deployed, it exerts a force through lanyard 330 to pull pins 323 and 324 rearwardly against the resistance of a spring 331. The bias of spring 331 opposes the bias exerted by spring 328 to normally retain pin 323 in its latching position and bearing against a wall 332 of seat back 30. When the interlocked ends of pins 323 and 324 are pulled out of housing 326, pins 323 and 324 separate, permitting pack 310 to pivot to its rearwardly tilted position shown in FIGURE 14.

With pack 310 in its rearwardly tilted position, recovery parachute 314 is then extracted by the gun mechanism described in the aforesaid Patent No. 3,133,178 to permit unentangled projection and deployment of recovery parachute 314 without subjecting the extracted occupant to bodily injury. Parachute 314 is secured to the occupant's harness 89 by a pair of riser straps 333 and 333a routed over or along side of the head rest portion of seat back 30 and connected to fittings 131. Suitable parachute restraint straps 333b also extend over or along side of the head rest portion of seat back 30 as shown.

Referring now to FIGURES 15–25, the occupant of the aircraft sets the escape apparatus of this invention in operation by pulling on handle 210 which is connected through a conventional disconnect 334 (FIGURE 25) to actuate a standard canopy jettison release mechanism 335 and to detonate cartridges 180 and 212 for launching rocket 104. Cartridges 180 and 212 are of the delayed action type which are set to detonate about 0.5 second after mechanism 335 is actuated to release canopy 22. As a result, canopy 22 is jettisoned followed by the launching of rocket 104 in an unignited condition through the hatch opening as shown in FIGURE 16. Also by pulling handle 210, a suitable linear shaped canopy cutter 336 is detonated after a delay of about 0.3 second to assure the removal of canopy 22 before rocket 104 is launched. A suitable rocket storage lock mechanism 337 may be provided for securing rocket 104 in stored position within the aircraft and is released at the same time mechanism 335 is actuated by pulling handle 210.

When rocket 104 reaches the end of tow lines 128 and 130 as shown in FIGURES 17 and 18, the rocket propellant 109 is ignited in response to the sensing of the tension in lines 128 and 130 as previously described. Burning of the rocket propellant propels rocket 104 further away from the aircraft to extract the occupant from cockpit 24 as shown in FIGURES 18 and 19.

When lines 128 and 130 are pulled taut, seat back 30 is released for extraction with the occupant. This is accomplished in the manner previously described. Alternatively, seat back 30 may be releasably supported in its sitting position by the latch construction incorporated in a second embodiment to be described later on and illustrated in FIGURES 26, 35, and 36. With this latter form of releasable seat back support, the tension applied through tow lines 128 and 130 as a result of launching rocket 104 releases the seat back support latch to free seat back 30 from the aircraft.

As a result, seat back 30, which is strapped to the occupant, slides upwardly along tracks 56 and 58 in its back and head supporting position. Seat pan 28 disengages from back 30 after seat back 30 is pulled upwardly a short distance causing the forward end of pan 28 to tilt downwardly as shown in FIGURES 18 and 19. It will be appreciated that seat pan 28 may be secured to back 30 by suitable pins which are shearable by lifting seat back 30. This allows the occupant's posture to become erect as he is pulled through the aircraft hatch opening.

As rocket 104 continues to move away from the aircraft under its power, the occupant trailing remotely behind the aft end of rocket 104 is pulled clear of the aircraft as shown in FIGURE 20. After a predetermined rocket flight period, charges 286 and 288 are automatically detonated just prior to depletion of the rocket propellant in lines 128 and 130 (FIGURE 21) and thereby free the extracted occupant from rocket 104. Rocket 104 under its remaining power then moves a safe distance away from the extracted occupant to avoid injury to the extracted occupant or damage to the occupant's parachute when it is projected and deployed.

Referring now to FIGURE 22, pilot parachute 312 is projected by an aneroid timer or a standard manual operator. Deployment of parachute 312 releases latch assembly 322 and pulls the upper end of pack 310 rearwardly. Following deployment of pilot parachute 312, recovery parachute 314 is then ejected by a projectile (not shown) as described in the aforesaid Patent No. 3,133,718 or manually projected in any conventional manner and inflated as shown in FIGURE 24 to provide for the safe descent of the extracted occupant. Deployment of parachute 314 disengages pilot parachute 312.

A preferred construction of this invention illustrated in FIGURES 26–31 comprises a modified seat assembly 340 and a modified rocket 342. Rocket 342 is pivotally mounted in the aircraft for swinging movement between angularly spaced apart aiming positions for low speed escape and high speed escape as will be described later on in detail. In this embodiment, seat assembly 340 remains with the aircraft, but extends into the position shown in FIGURE 28 to provide an escape chute for the occupant extracted by launching rocket 342.

As shown in FIGURES 26 and 27, seat assembly 340 comprises a cushioned seat pan 344 and a cushioned seat back 346. Seat back 346 comprises a rigid frame 348 having parallel, upstanding side members 350 and 352. Respectively mounted on members 350 and 352 are a plurality of vertically spaced apart guide rollers 354 and 356 which are rotatable about parallel, normally horizontal axes. Guide rollers 354 and 356 respectively extend into channel shaped guide rails 358 and 360. Guide rails 358 and 360 extend upwardly along opposite sides of seat back 346 and are rigidly fixed at opposite ends to the frame of the aircraft by brackets indicated generally at 362.

As best shown in FIGURES 35 and 36, a rigid support tube 363 extending across the rear of seat back 346 is journalled on members 350 and 352 by suitable bearings 364 and 365. A collar 366 fixed to tube 363 midway between members 350 and 352 is formed integral with a hook-shaped arm 367 which is releasably seated in a fitting 368. Fitting 368 is securely fixed on the upper end of a rigid mounting rod 369 of a seat supporting and adjusting mechanism 370 which comprises a cylinder 371 receiving rod 369 and fixed to the frame of the aircraft by a bracket 372 (FIGURE 26). Rod 369 is normally fixed in place to support seat back 346 in its upright sitting position shown in FIGURE 26, but may be selectively axially shiftable by suitable, unshown means to vertically adjust the position of seat back 346 for the comfort of the occupant.

As shown in FIGURE 35, tube 363 is normally retained against rotation by torsion springs 373 and 374 each secured at opposite ends to frame 348 and tube 363 respectively. Springs 373 and 374 bias tube 363 in a clockwise direction as viewed from FIGURE 36 to seat the hooked end of arm 367 against a rigid wall surface 375 of fitting 368.

With continued reference to FIGURE 26, seat pan 344 is mounted on a rigid frame 376 which is pivotally secured at its aft end to the bottom of seat back 346 by a hinge assembly 377 which permits pan 344 to swing about a normally horizontal axis. When seat back 346 is shifted upwardly along rails 358 and 360, seat pan 344 rotates in a counterclockwise direction about the normally horizontal axis provided by hinge assembly 377, permitting the aft end of seat pan 344 to be pulled upwardly.

As shown in FIGURES 26, 33, and 35, seat pan 344 is retained in its normal horizontal sitting position by a pair of rigid braces respectively comprising rods 378 and 379. Rods 378 and 379 are pivotally secured to frame 376 at their forward ends and extend upwardly and rearwardly along opposite sides of seat back 346. The upper rearward ends of rods 378 and 379 are supported from opposite ends of tube 363 by pin and arm assemblies 380 and 381 respectively. Assembly 380 comprises a rigid hook-shaped arm 382 which is fixed to tube 363 and which hooks under and supportingly engages a pin 383. Pin 383 is fixed to the upper end of rod 378 and extends laterally along an axis normal to the longitudinal axis of rods 378. Arm 382 is normally held in its pin engaging position shown in FIGURE 33 to support seat pan 344 in its normal horizontal sitting position. Assembly 381 is on the same construction as assembly 380.

By rotating tube 363 is a counterclockwise direction as viewed from FIGURES 26 and 36, arms 382 disengage from pins 383 of assemblies 380 and 381 to release rods 378 and 379 and thereby allow seat pan 344 to pivot about the axis at hinge assembly 377 when seat back 346 is displaced upwardly along rails 358 and 360.

As shown in FIGURES 26, 34, and 36, the occupant of the aircraft is strapped to seat assembly 340 by conventional torso harness lap straps 384 and 385 which are similar to straps 88 shown in FIGURE 8. Strap 384 is secured at one end to a torso harness hip fitting (not shown) and at the other end to a tube 386 by a releasable connector assembly 387. Assembly 387 comprises, as shown in FIGURE 34, a fitting 388 secured to strap 384 and rigidly mounting a laterally extending pin 389. A hook-shaped arm 390 forming a part of assembly 387 is fixed to one end of tube 386 and releasably engages pin 389 to secure strap 384 to tube 386.

Similarly, strap 385 is secured at one end to a torso harness hip fitting (not shown) and at its other end to tube 386 by an assembly 391. Assembly 391 is of the same construction as assembly 387 with like reference numerals being used to designate like parts.

Tube 386, as shown in FIGURE 36, is rotatably mounted on frame 348 across the rear of seat back 346 in parallel relation with tube 363 and biased in a clockwise direction, as viewed from FIGURE 26, by a pair of torsion springs 392 and 393 each having their opposite ends secured to tube 386 and to frame 348 respectively. Springs 392 and 393 resiliently urge arms 90 of assemblies 387 and 391 into engagement with pins 389 to secure straps 384 and 385 to the seat assembly. Tube 386 is rotatable in a counterclockwise direction by means to be described later on to disengage arms 390 from pins 389 of assemblies 387 and 391 to thereby release straps 384 and 385. Tube 386 may form a part of hinge assembly 377.

To release seat back 346 for upward displacement, a lanyard 392 (see FIGURE 37) is secured to either or both tow lines 128 and 130 and to a rod 393. Rod 393 is pivotally secured to a lever 394a which is fixed to tube 363. When rocket 342 is launched to pull tow lines 128 and 130 as previously described, lanyard 392 is tensioned to transmit the rocket launching force through rod 393 and lever 394a to rotate tube 363 in a counterclockwise direction against the bias of springs 373 and 374. As a result arm 367 disengages from fitting 368 to release seat back 346 from its support in the aircraft.

With seat back 346 released, the upward rocket launching force transmitted through tow lines 128 and 130, the occupant's torso harness and straps 384 and 385 is applied to seat assembly 340 to slide seat back 346 upwardly along guide rails 358 and 360 from the position shown in FIGURE 26 to the position shown in FIGURE 28. By pulling seat back 346 upwardly, the aft end of seat pan 344 is swung upwardly and in a counterclockwise direction (as viewed from FIGURES 26 and 28) to a raised, generally upstanding position just below seat back 346. In this raised upstanding position, seat pan 344 co-operates with seat back 346 to form a chute for guiding the occupant from the aircraft in a substantially erect position. The upper end of seat back 346 in its raised position projects through the hatch opening to guide the occupant clear of the aircraft.

As best shown in FIGURE 26, a heel guide assembly 394 for limiting upward movement of seat pan 344 and seat back 346 and for deflecting the occupant's heels as he is extracted from the aircraft is shown to comprise a pair of forwardly facing metal panels 395 and 396 extending from one side of seat assembly 340 to the other. Panel 395 is normally disposed forwardly of seat pan 344 and is secured to pan 344 by a hinge assembly 397.

With continuing reference to FIGURE 26, panel 396 extends rearwardly under seat pan 344 from the lower edge of panel 395 and is secured to panel 395 by a hinge assembly 398. The rearward edge of panel 396 is secured by a further hinge assembly 399 to the frame or cockpit floor of the aircraft. Hinge assemblies 397, 398, and 399 permit panels 395 and 396 to be so articulated about parallel, normally horizontal axes that they are swingable between their positions respectively shown in FIGURE 26 and in FIGURE 28.

When seat assembly 340 is in its normal sitting position shown in FIGURE 26, panel 396 extends rearwardly from panel 395 at an angle of about 90 degrees. When rods 378 and 379 are released and seat back 346 is raised to its chute forming position in FIGURE 28 to swing the rearward end of seat pan 344 upwardly, panels 395 and 396 swing about the pivot axes of hinge assemblies 397, 398, and 399 to form a substantially straight, continuous, rearwardly and upwardly inclined surface where panel 396 is substantially parallel to and contained in the same plane as panel 395. Movement of panels 395 and 396 to their positions shown in FIGURE 28 deflects the occupant's heels to prevent them from swinging back against seat pan 344 as the occupant is extracted from the aircraft. Extension of the deflecting surface provided by panels 395 and 396 to their positions in FIGURE 28 limits the movement of seat pan 344 and seat back 346, thus retaining these parts with the aircraft as the occupant is extracted.

Referring now to FIGURES 29 and 30, rocket 342 in certain respects is similar to rocket 104, and to the extent that rockets 342 and 104 are the same, like reference numerals have been used to designate like parts. As shown in FIGURE 30 a modified, cylindrical extension housing 400 snugly extends coaxially into the open aft end of casing 106 and has a coaxial, rearwardly opening tapped bore 402. Housing 400 is fixed to casing 106 by any suitable means. A mounting bolt 404 threaded in bore 402 extends coaxially rearwardly beyond housing 400 and mounts a bearing retainer sleeve 406. A bearing comprising a bushing 408 carried by sleeve 406 rotatably mounts an annular swivel fitting 410.

With continued reference to FIGURE 30, a thrust bearing 412 spaced axially rearwardly from bearing 408 is mounted on sleeve 406 and is axially retained between a radial flange 414 formed integral with the rearward end of sleeve 406 and the bottom wall of a rearwardly opening counterbored recess 416 formed coaxially in fitting 410. With this construction, swivel fitting 410 is axially retained between the rearwardly directed end face of housing 400 and flange 414 on sleeve 406.

With continued reference to FIGURE 30, bolt 404 is provided at its rearward end with an enlarged head 418 which is slidably received in an enlarged bore section 420 coaxially formed in sleeve 406. Sleeve 406 is axially slidable on bolt 404 between head 418 and the rearwardly directed end face of housing 400 for a purpose to be described shortly.

As shown in FIGURE 29, tow lines 128 and 130 are respectively secured around pins 422 and 423 which, in turn, are respectively fixed to bifurcated, diametrically opposed radially outwardly extending arms 424 and 426. Arms 424 and 426 are formed integral with a mounting collar 428 through which casing 106 slidably and coaxially extends.

When rocket 342 is stored in the cockpit of the aircraft, collar 428 is detachably secured to the upper end of rocket 342 by a specially constructed, threaded pin 430 having a small, shearable cylindrical post 431 extending into a blind, radial bore formed in nose cap housing 112. Collar 428 is also detachably secured to a launching tube 432 by threaded pins 433 which are of the same construction as pin 430. When rocket 342 is launched from the aircraft, collar 428 is axially displaced to the aft end of the rocket in a manner to be described shortly.

As shown in FIGURES 30 and 31, the diameter of swivel fitting 410 is slightly greater than the diameters of housing 400 and casing 106 to provide an axially facing marginal surface 434 on which collar 428 seats when it is axially shifted to the aft end of rocket 342. The outer diameters of casing 106 and housing 400 are the same to provide a continuous cylindrical surface along which collar 428 slides when pulled rearwardly from its stored position adjacent the forward end of rocket 342.

With continued reference to FIGURE 30, pin 276 for firing detonator 278 is carried by a cylindrical member 436 which is coaxially and slidably mounted in a stepped through bore 438 formed in housing 400 along an axis extending parallel to but laterally offset from the longitudinal axis of rocket 342. Member 436 is formed with a diametrically enlarged forward end section 440 which is slidably received in an enlarged section 442 of bore 438. Pin 276 extends axially forwardly from end section 440 and is engageable with detonator 278 by forward movement of member 436 from the positions of parts shown in FIGURE 30.

With continuing reference to FIGURE 30, the rearward end of member 436 is formed with a knuckle 444 which is coaxially received in a spring tang lock 448 having a tubular section which is slotted to form fingers 449 which securely grip knuckle 444 to retain member 436 in its rearwardly retracted position against the bias of a coiled compression spring 448. Spring 448 surrounds a reduced diametered shank section 450 of member 436 and reacts against a forwardly facing internal annular shoulder 452 in bore 438 to bias member 436 forwardly toward a detonating position.

With continuing reference to FIGURE 30, lock 448 extends rearwardly and coaxially through a stepped bore 454 formed in swivel fitting 410. At its rearward end, lock 448 terminates in an enlarged cylindrical section 456. Section 456 seats against a rearwardly directed internal annular shoulder formed in bore 454 to axially retain swivel fitting 410 in abutment with the rearwardly directed end face of housing 400 when rocket 342 is stored in the aircraft.

When rocket 342 is launched from the aircraft, collar 428 is shifted to its aft seating position on fitting 410 so that the tension applied through tow lines 128 and 130 displaces swivel fitting 410 and sleeve 406 axially rearwardly to the position shown in FIGURE 31 where a rearwardly facing internal, annular shoulder 458 formed in sleeve 406 abuts head 418 of bolt 404. As a result of this motion lock 448 and member 436 are pulled axially rearwardly with swivel fitting 410 to compress spring 448. When the ends of fingers 449 clear the rearward edge of stepped bore 438, knuckle 444 is released with the result that member 436 separates from lock 448, permitting spring 452 to urge member 436 forwardly to fire detonator 278. By firing detonator 278, charge 280 is detonated to ignite the main body of rocket propellant 109 and charge 302 in the manner described in the previous embodiment.

Similar to the first embodiment, housing 400 also mounts a second firing mechanism (not shown) which is of the same construction as the firing mechanism just described and which is simultaneously actuatable with the firing mechanism just described to ignite propellant 109 and charge 302 when lines 128 and 130 are pulled taut.

As shown in FIGURE 29, collar 428 is formed with an inwardly opening annular recess 462. Cross through bores 464 and 466 respectively formed in pins 422 and 423 are connected to recess 462 by substantially radially extending passages 468 and 470 which are formed in arms 424 and 426. Sheath contained mild detonating fuses generally indicated at 472 are contained in recess 462, bores 464 and 466, and passages 468 and 470. Fuses 472 extend along tow lines 128 and 130 from arms 426 and 424 and are connected to charges 286 and 288 which, as previously explained, are detonatable to cut lines 128 and 130 for freeing the extracted occupant from rocket 342.

When collar 428 is axially shifted to the aft end of rocket 342 to displace swivel fitting 410 rearwardly to the position shown in FIGURE 31, recess 462 radially aligns with a radial bore 473 communicating with the rearward end of bore 296 and containing a length of mild detonating fuse 474 which is connected to detonator 294. Following the launching of rocket 342 and the ignition of the main body or rocket propellant 109, charge 302 burns out as previously explained to expose the apertured bottom of well 298 with the result that the combustion gases generated in chamber 108 urge piston 304 rearwardly to fire detonator 294 which in turn ignites fuse 474. Ignition of fuse 474 detonates fuses 472 which, in turn, detonate charges 286 and 288 to cut lines 128 and 130.

As shown in FIGURE 30, extension housing 400 is slidably and coaxially received in a forwardly opening bore 480 formed in a launching piston 482. Piston 482 is slidably and coaxially received in launching tube 432 which extends upwardly in radially spaced relation to casing 106 and terminates at its forward and axially rearwardly of collar 428 when collar 428 is in its raised stored position adjacent the forward end of rocket 342. The lower end of launching tube 432 coaxially receives a cylindrical section 486 of a breech block 488. Tube 432 is fixed to section 486 by any suitable means such as threading.

With continued reference to FIGURE 30, section 486 is coaxially formed with a smooth cylindrically walled forwardly opening recess 490 defining a pressure chamber 492 which is exposed to the rearwardly directed end face of piston 482. Pressure chamber 492 communicates through a venturi passage 494 with an internal combustion chamber 496 formed in breech block 488.

Still referring to FIGURE 30, two conventional cartridges 498 and 500 are mounted in combustion chamber 496. Cartridges 498 and 500 are respectively detonated by firing mechanisms 502 and 504. Firing mechanisms 502 and 504 each are substantially the same as the firing mechanism described for detonating cartridge 180 in the previous embodiment and to the extent that these firing mechanisms are the same, like reference numerals have been used to designate like parts.

As shown in FIGURES 26 and 29, launching tube 432 is mounted rearwardly of seat assembly 340 and is tilted forwardly to guide rocket 342 along an inclined, straight path passing over seat assembly 340 and through the hatch opening of the aircraft. A support collar 508 suitably secured to the upper end of launching tube 432 is provided with an integral, rearwardly extending arm 510 through which a pivot pin 512 rotably extends. Pin 512 is fixed to the frame of the aircraft to swingably support tube 432 about an axis extending at right angles to the longitudinal axis of tube 432.

With continued reference to FIGURE 26, an actuator 514 for swinging tube 432 about the axis of pin 512 comprises a power member or ram (not shown) which is slidably and coaxially received in a cylinder 516. Cylinder 516 is pivotally secured by a pin 518 to the frame of the aircraft above tube 432. An operating arm 520 fixed to the ram in cylinder 516 is pivotally secured by a pin 522 to arm 510 as shown. The axes of pins 512, 518, and 522 are in parallel spaced apart relationship.

Actuator 514 preferably is operated by ram air pressure to automatically position tube 432 in a manner to be described in greater detail later on. It will be appreciated, however, that a suitable alternative means (not shown) may be employed to position tube 432 by extending and retracting arm 522.

When arm 520 is retracted, tube 432 is in its full line position shown in FIGURE 26 and preferably makes an angle of 55 degrees with a normally vertical line to establish an optimum, forwardly inclined rocket launching path when the aircraft is traveling at relatively high speeds. When the aircraft is traveling at low speeds, actuator 514 is operated to extend arm 520 and thereby swing tube 432 in a clockwise direction about the pivot axis of pin 512 to the phantom line position shown in FIGURE 26. In this latter position, the angle which tube 432 makes with a normally vertical line is preferably reduced to 25 degrees such that tube 484 is only slightly inclined.

Ram air used to position tube 432 is conveyed through suitable conduit means (not shown) to cylinder 516 from the exterior of the aircraft, and the pressure of the ram air increases and decreases as the aircraft velocity respectively increases and decreases to automatically position tube 432. Thus, it is clear that tube 484 is swingable between its low and high aircraft speed positions to aim rocket 342 for launching along an optimum path passing through the aircraft hatch opening. Suitable stops (not shown) may be provided to limit the angular displacement of tube 432 between its low and high speed positions.

When the occupant of the aircraft desires to set the escape apparatus shown in FIGURES 26–31 in operation, he pulls a conventional D-handle 528 (see FIGURE 32) which is operatively connected through a suitable disconnect 529 and a motion transmitting cable assembly 530 to a standard canopy jettison release mechanism 532, a shaped charge canopy cutter initiator 533, firing mechanisms 502 and 504, and to an extraction rocket latch assembly 534.

In addition, cable assembly 530 is connected through an inertia reel lock control 535 to a conventional inertia reel 536 which has a standard manual control 537. Reel 536 is connected to control the tension in shoulder straps 538 connected to the occupant's torso harness in the usual manner. Latch assembly 534 may be of any suitable form for securing rocket 342 in its stored position within the aircraft and for purposes of this invention is only schematically shown.

Initiator 533 is of standard, delayed action construction for detonating shaped charges (not shown) which are secured to the body of the aircraft for cutting loose canopy 22. Preferably, initiator 533 detonates the unshown, canopy cutting, shaped charges about 0.3 second after ring 528 is pulled by the occupant. Cartridges 498 and 500 are also of conventional delayed action construction and preferably detonates about 0.5 second after handle 528 is pulled to withdraw pins 194 of firing mechanisms 502 and 504. As previously described, pins 188 of firing mechanisms 502 and 504 separate from pins 194 when the interlocked ends of pins 188 and 194 are withdrawn by pulling handle 528. By releasing pins 188, firing pins 186 of mechanisms 502 and 504 are advanced by springs 204 to detonate initiators forming a part of cartridges 498 and 500.

When handle 528 is pulled, mechanism 532 is actuated to jettison canopy 22 in the usual manner and latch assembly 534 is released to permit rocket 342 to be launched from the aircraft. After a delay of about 0.3 second, initiator 533 is detonated to detonate the shaped charges for cutting canopy 22 loose in the event the mechanism 532 fails to jettison the canopy. After canopy 22 is jettisoned or cut loose, cartridges 498 and 500 detonate.

The gases generated by detonation of cartridges 498 and 500 enter pressure chamber 492 through passage 494 to urge piston 482 and rocket 342 toward the forward end of the launching tube 432. As rocket 342 moves out of launching tube 432, pin 430 is sheared, leaving collar 428 secured to tube 432 by pins 433. Rocket 342 slides through collar 428 until piston 482 reaches the forward end of tube 432 where it strikes collar 428 with sufficient impact to shear pins 433. As a result, collar 428 is freed from tube 432 and moves away from tube 432 at the same velocity as rocket 342. The impact of engaging piston 482 with collar 428 is sufficient to separate piston 482 from rocket 342.

Rocket 342, still unignited, moves out of tube 432 and through the aircraft hatch opening along its launching path with collar 428 being disposed adjacent the aft end of casing 106. When rocket 342 reaches the end of tow lines 128 and 130, the initial tension applied through lines 128 and 130 pulls on collar 428 to slide it to the aft end of housing 400 where it shoulders on fitting 410, displacing it rearwardly to the position shown in FIGURE 31. By displacing fitting 410 to its rearward position spaced from housing 400, lock 448 is pulled from bore 438, permitting pin 276 to be urged forwardly under the bias of spring 448 to fire detonator 278. As a result, charge 280 is fired to ignite the rocket propellant 109 and charge 302.

By igniting charge 109, rocket 342 moves under its own power away from the aircraft to exert an upward pull on the occupant of the aircraft. The tension established in lines 128 and 130 is transmitted through lanyard 392 to rotate tube 363 in a counterclockwise direction as viewed from FIGURE 37 to disengage arm 367 from fitting 368. As a result, seat back 346 is released from mechanism 370. The upward force exerted by rocket 342 is transmitted through the occupant's torso harness to pull seat back 346 upwardly along rails 358 and 360.

By rotating tube 363 in a counterclockwise direction, arms 382 disengage from pins 383 to release rods 378 and 379 as previously explained, thereby permitting the aft end of seat pan 344 to be pulled upwardly as seat back 346 is pulled upwardly by rocket 342 to form a chute with seat back 346 which causes the occupant's posture to become erect.

As shown in FIGURE 34, tube 386 is connected to seat back 346 by a motion transmitting linkage 548 for releasing straps 384 and 385. Linkage 548 comprises a rod 550 pivotally connected at opposite ends to an ear 552 and to an arm 554 of a lever 556. Ear 552 is fixed to tube 386 as shown. Lever 556 is rockably mounted on the aircraft frame by a pin 558 which extends along an axis parallel to the rotational axis of tube 386.

With continued reference to FIGURE 34, lever 556 is provided with a second arm 560 to which one end of a rod 562 is pivotally connected. The other end of rod 562 is pivotally connected to an ear 564 which is fixed to seat back frame 348. Arms 554 and 560 are so related that the upward motion of seat back 346 is transmitted to rock lever 556 in a clockwise direction. As a result, tube 386 is rotated in a counterclockwise direction to disengage arms 390 from pins 389 of assemblies 387 and 391, thereby releasing straps 384 and 385 from seat assembly 340.

The counterclockwise motion of tube 386 is transmitted through a suitable linkage 568 to a mild detonating fuse initiator 570 which detonates a mild detonating fuse 572. Fuse 572 is connected to detonate shaped charges 574 and 576 secured to shoulder straps 538. Thus it is clear that the tension applied through tow lines 128 and 130 as a result of launching rocket 342 is effective to release straps 384 and 385 and also to cut straps 538 by detonating charges 574 and 576, thereby freeing the occupant and his recovery parachute from seat assembly 340.

Released from seat assembly 340, the occupant then is pulled upwardly along the chute formed by seat pan 344 and seat back 346 as shown in FIGURE 28, and is extracted from the aircraft by rocket 342. In this embodiment, the recovery parachute (not shown) is located between the occupant's back and seat back 346, and the occupant is seated on a survival kit indicated at 580.

Just prior to burn out of the main body of rocket propellant, charge 302 burns out to effect detonation of charges 286 and 288 for cutting tow lines 128 and 130 in the manner previously described. After the extracted occupant is separated from rocket 342, his recovery parachute is projected and deployed to provide for his safe descent to the ground.

To effect a bail-out without using rocket 342, an emergency release handle 582 (see FIGURE 32) is connected by a suitable, motion transmitting cable assembly 584 to a mild detonating fuse initiator 586 and to the assemblies 381 and 391 for releasing belts 384 and 385. Initiator 586 is connected by mild detonating fuses indicated generally at 588 to fuse 572 and to charges 286 and 288 on tow lines 128 and 130.

By pulling handle 582, belts 384 and 385 are released and fuse 588 is detonated by initiator 586 to detonate fuse 572 and charges 286 and 288. Detonation of charges 286 and 288 cut lines 128 and 130 to release the occupant from rocket 342. Detonation of fuse 572 causes detonation of charges 574 and 576 to cut straps 538, thereby releasing the occupant from seat assembly 340. Freed from rocket 342 and seat assembly 340 the occupant may now effect a manual bail-out.

What is claimed and desired to be secured by United States Letters Patent is:

1. An escape apparatus for removing an occupant from a vehicle and comprising a rocket carried by said vehicle, an extendible towline secured to said rocket, means adapted to secure said occupant to said towline remote from the attachment of said towline to said rocket, means for forcibly launching said rocket for flight away from said vehicle and for igniting said rocket while the occupant is still in said vehicle for continuing the flight away from said vehicle, said rocket during said flight extending said towline to a tensioned, motion-transmitting condition while the occupant is still in said vehicle and then extracting said occupant from said vehicle through the connection provided by the tensioned towline.

2. The escape apparatus defined in claim 1 wherein said rocket is a tractor-type rocket having nozzle means adjacent its forward end, and wherein a swivel joint is mounted on the aft end of said tractor-type rocket for connecting said towline thereto.

3. The escape apparatus defined in claim 1 comprising escape control means adapted to be manipulated by said occupant for actuating said launching means to launch said rocket and thereby initiate his escape from said vehicle.

4. The escape apparatus defined in claim 1 comprising means for disconnecting said rocket from the extracted occupant prior to the burn-out of the rocket fuel to enable said rocket to move away from the extracted occupant under its own power.

5. The escape apparatus defined in claim 4 wherein said disconnecting means is responsive to a predetermined condition for severing said towline following a predetermined delay after the rocket fuel is ignited.

6. The escape apparatus defined in claim 4 wherein said rocket is launched from said vehicle in unignited condition and wherein said rocket igniting means comprises a mechanism actuated following a predetermined delay after said rocket is launched for igniting the rocket fuel.

7. The escape apparatus defined in claim 6 wherein said mechanism is actuated in response to the tension applied through said towline by the launching of said rocket from said vehicle.

8. The escape apparatus defined in claim 4 wherein said towline is secured to the rearward end of said rocket and wherein said rocket comprises a tractor-type rocket motor assembly having exhaust nozzle means only adjacent to its forward end.

9. An escape apparatus for removing an occupant from a vehicle that is capable of being airborne and comprising a rocket mounted in said vehicle, means adapted to be worn by said occupant, flexible means comprising an extendible line secured at spaced apart regions respectively to said rocket and to said means worn by said occupant, means for selectively, forcibly launching said rocket in unignited condition from said vehicle for flight away from said vehicle, means for automatically igniting the propellant of said rocket in response to a predetermined condition following the launching of said rocket while the occupant is still in said vehicle for continuing the flight of said rocket away from said vehicle, said rocket during said flight extending said line to a tensioned, motion-transmitting condition while the occupant is still in said vehicle and then extracting said occupant from said vehicle through the connection provided by the tensioned line, said line being of sufficient length that the extracted occupant trails behind said rocket in its flight from said vehicle.

10. The escape apparatus defined in claim 9 wherein said means worn by said occupant comprises a harness.

11. The escape apparatus defined in claim 9 wherein said means for igniting the propellant of said rocket comprises means for sensing when said line is pulled substantially taut.

12. The escape apparatus defined in claim 9 comprising means for automatically severing said flexible means following ignition of the rocket propellant but prior to burn out of the propellant.

13. The escape apparatus defined in claim 1 comprising a seat assembly for said occupant in said vehicle, said seat assembly comprising a seat pan secured to said vehicle and a detachable seat back, means for strapping said seat back to said occupant, and means mounting said back in said assembly for detachment from said seat pan and for extraction with said occupant upon the exertion of the rocket launching force applied through said towline.

14. The escape apparatus defined in claim 13 comprising means so mounting said seat pan in said seat assembly that its forward end tilts downwardly upon relative upward motion of said seat pan.

15. The escape apparatus defined in claim 1 wherein said rocket comprises a tractor type rocket assembly having nozzle means adjacent its forward end for imparting a deliberate stabilizing spin to said rocket in a predetermined direction.

16. The escape apparatus defined in claim 9 wherein said securing means comprises a swivel joint having a member attached to said line and being freely rotatable about an axis substantially aligning with the longitudinal axis of said rocket.

17. An apparatus for removing a load from a space and comprising a rocket mounted in said space, a flexible towline, means so securing said towline to said load and said rocket that it is pulled taut by flight of said rocket away from said load, means for launching said rocket from said space, means for igniting the fuel in said rocket following a predetermined delay after said rocket is launched to extract said load from said space through the tension applied to said towline by the fuel-ignited flight of said rocket away from said space, and means responsive to a predetermined condition for releasing said rocket from said load prior to the burn-out of rocket fuel and after said load is extracted a predetermined distance from said space by ignited flight of said rocket to enable said rocket to move away from the extracted load under its own power.

18. The apparatus defined in claim 17, wherein said towline is sufficiently long that said load trails remotely behind said rocket during ignited flight of said rocket and wherein said rocket is a tractor-type rocket having nozzle means disposed only adjacent to its forward end.

19. An apparatus for removing a load from the region of a crew compartment in an air or space vehicle comprising a rocket carried by said vehicle, an extendible towline connected at opposite ends respectively to said load and to the aft end of said rocket, means for forcibly launching said rocket from said vehicle for flight away from said vehicle, and means for igniting the rocket fuel following a predetermined time delay after said rocket is launched while said load is still carried by said vehicle for continuing the flight of said rocket away from said vehicle, said rocket during said flight extending said towline to a tensioned, motion-transmitting condition while the load is still carried by said vehicle and then pulling said load away from said vehicle through the connection provided by the tensioned towline.

20. The apparatus defined in claim 19 wherein said rocket is a tractor type rocket having nozzle means disposed only adjacent to its forward end and arranged to impart a stabilizing spin to the rocket during its fuel-ignited flight.

(Other references on following page)

References Cited

UNITED STATES PATENTS

| | | | |
|---|---|---|---|
| 3,242,862 | 3/1966 | Stegbeck et al. | 102—22 |
| 2,683,415 | 7/1954 | Wilson | 102—49 |
| 2,751,171 | 6/1956 | Martin | 244—141 |
| 2,826,120 | 3/1958 | Lang et al. | 89—1.803 |
| 2,892,602 | 6/1959 | Servanty | 244—141 |
| 2,946,261 | 7/1960 | Crockett | 60—201 X |
| 3,020,011 | 2/1962 | Beem et al. | 244—141 |

MILTON BUCHLER, *Primary Examiner.*

RICHARD A. DORNON, *Assistant Examiner.*

U.S. Cl. X.R.

46—74; 89—1.8; 102—63; 244—151, 137, 141